United States Patent
Moore et al.

(10) Patent No.: US 10,092,881 B2
(45) Date of Patent: Oct. 9, 2018

(54) PERMANENT HYDROPHILIC POROUS COATINGS AND METHODS OF MAKING THEM

(75) Inventors: David Roger Moore, Albany, NY (US); Ryan Austin Hutchinson, Albany, NY (US)

(73) Assignee: BHA ALTAIR, LLC, Overland Park, KS (US)

( * ) Notice: Subject to any disclaimer, the term of this patent is extended or adjusted under 35 U.S.C. 154(b) by 882 days.

(21) Appl. No.: 12/275,368

(22) Filed: Nov. 21, 2008

(65) Prior Publication Data

US 2009/0188857 A1    Jul. 30, 2009

Related U.S. Application Data

(63) Continuation-in-part of application No. 12/019,973, filed on Jan. 25, 2008, and a continuation-in-part of application No. 12/019,976, filed on Jan. 25, 2008.

(51) Int. Cl.
*B01D 67/00* (2006.01)
*B01D 71/40* (2006.01)
(Continued)

(52) U.S. Cl.
CPC ......... *B01D 67/009* (2013.01); *B01D 53/228* (2013.01); *B01D 67/0093* (2013.01); *B01D 71/32* (2013.01); *B01D 71/34* (2013.01); *B01D 71/36* (2013.01); *B01D 71/38* (2013.01); *B01D 71/40* (2013.01); *B01D 2323/02* (2013.01);
(Continued)

(58) Field of Classification Search
CPC ............ B01D 67/0088; B01D 2323/30; B01D 67/0093; B01D 71/32; B01D 2323/02; B01D 67/009; B01D 2323/38; B01D 2325/36; B01D 2325/34; B01D 67/0083; B01D 71/76; C08J 2327/12; C08J 2429/00; C08J 2433/00; C08J 2439/00; C08J 9/405; C08J 9/42; C08J 5/2275; C08J 5/2293; D06M 14/28; D06M 14/26; D06M 15/27;
(Continued)

(56) References Cited

U.S. PATENT DOCUMENTS 4,113,912 A    9/1978   Okita
4,778,596 A   10/1988   Linder et al.
(Continued)

FOREIGN PATENT DOCUMENTS

CN    1705505 A    12/2005
EP    0 410 357    1/1991
(Continued)

OTHER PUBLICATIONS

EP 09 17 6385 Search Report and Opinion, dated Apr. 28, 2010.
(Continued)

*Primary Examiner* — Jennifer A Steele
(74) *Attorney, Agent, or Firm* — Reinhart Boerner Van Deuren P.C.

(57) ABSTRACT

A membrane includes a porous base membrane and a hydrophilic coating. The coating comprises a hydrophilic additive and a hydrophilic polymer derivatized with an electron beam reactive group adapted to form a radical under high energy irradiation. In some embodiments, the membrane comprises a fluoropolymer. Also disclosed are processes for forming the membrane.

34 Claims, 9 Drawing Sheets

(51) Int. Cl.
  *B01D 53/22* (2006.01)
  *B01D 71/36* (2006.01)
  *B01D 71/38* (2006.01)
  *B01D 71/32* (2006.01)
  *B01D 71/34* (2006.01)

(52) U.S. Cl.
  CPC .... *B01D 2323/385* (2013.01); *B01D 2325/36* (2013.01)

(58) Field of Classification Search
  CPC ....... D06M 2200/00; C08F 2/46; C08F 20/06; C08F 283/06; C08F 259/06; C08F 265/04
  USPC .................. 442/59, 76, 77, 118, 164–171; 428/304.4, 306.6, 308.4, 311.11; 427/496–507; 210/500.21, 500.35
  See application file for complete search history.

(56) References Cited

U.S. PATENT DOCUMENTS

| | | | |
|---|---|---|---|
| 4,917,793 A | | 4/1990 | Pitt et al. |
| 4,944,879 A | | 7/1990 | Steuck |
| 5,049,275 A | * | 9/1991 | Gillberg-LaForce et al. ............... 210/500.27 |
| 5,100,689 A | * | 3/1992 | Goldberg et al. ............... 600/36 |
| 5,130,024 A | | 7/1992 | Fujimoto et al. |
| 5,137,633 A | | 8/1992 | Wang |
| 5,209,850 A | | 5/1993 | Abayasekara et al. |
| 5,354,587 A | | 10/1994 | Abayasekara |
| 5,374,334 A | | 12/1994 | Sommese |
| 5,540,837 A | * | 7/1996 | Lunkwitz et al. ............ 210/490 |
| 5,629,084 A | | 5/1997 | Moya |
| 5,874,165 A | * | 2/1999 | Drumheller ................ 428/308.4 |
| 6,083,393 A | * | 7/2000 | Wu et al. .................. 210/500.35 |
| 6,264,936 B1 | | 7/2001 | Sawan et al. |
| 6,872,241 B2 | | 3/2005 | Soane et al. |
| 7,291,696 B2 | | 11/2007 | Duong |
| 7,381,331 B2 | | 6/2008 | Duong et al. |
| 7,631,768 B2 | | 12/2009 | Duong |
| 7,704,598 B2 | | 4/2010 | Jain et al. |
| 2005/0266228 A1 | | 12/2005 | Jain et al. |
| 2006/0016748 A1 | | 1/2006 | Koguma |
| 2007/0075013 A1 | | 4/2007 | Duong |
| 2007/0102349 A1 | | 5/2007 | Duong |
| 2007/0106052 A1 | | 5/2007 | Duong |
| 2007/0154703 A1 | * | 7/2007 | Waller et al. .............. 428/319.3 |
| 2007/0190166 A1 | | 8/2007 | Howard, Jr. et al. |
| 2008/0199756 A1 | | 8/2008 | Takahashi |
| 2009/0117367 A1 | | 5/2009 | Stone et al. |
| 2009/0130161 A1 | | 5/2009 | Sarangapani |
| 2009/0205116 A1 | | 8/2009 | Stone et al. |
| 2009/0239435 A1 | | 9/2009 | Davis et al. |
| 2010/0077529 A1 | | 4/2010 | Stone et al. |
| 2012/0135658 A1 | | 5/2012 | Stone et al. |

FOREIGN PATENT DOCUMENTS

| | | |
|---|---|---|
| EP | 0 456 939 | 11/1991 |
| EP | 0782864 A1 | 7/1997 |
| EP | 1552878 A1 | 7/2005 |
| EP | 1 783 147 | 5/2007 |
| JP | S63190602 A | 8/1988 |
| JP | H06502781 A | 3/1994 |
| JP | 07504580 A | 5/1995 |
| JP | 2003516245 A | 5/2003 |
| JP | 2005508245 A | 3/2005 |
| JP | 2006-198611 | 8/2006 |
| JP | 2007252893 A | 10/2007 |
| JP | 2008500205 A | 1/2008 |
| WO | 9518840 A1 | 7/1995 |
| WO | 1998010806 A1 | 3/1998 |
| WO | 2007084452 A2 | 7/2007 |
| WO | 2008076097 A1 | 6/2008 |

OTHER PUBLICATIONS

English Abstract for Japanese Patent 61249503 A2; Applicants, Koichi et al.; published Nov. 6, 1986, 1 page.

Aumauwan et al., "Attachment of amoxicillin to expanded polytetrafluoroethylene (ePTFE) microwave plasma modified surfaces", Polymer Preprints, 2006, pp. 9-10, 47(2).

Dargavillea et al., "High energy radiation grafting of fluoropolymers", Progress in Polymer Science, 2003, pp. 1355-1376, vol. 28.

Yamada et al., "Membrane properties of porous and expanded poly(tetrafluoroethylene) films grafter with hydrophilic monomers and their permeation behavior", Journal of Applied Polymer Science, 1996, pp. 1899-1912, vol. 61.

* cited by examiner

PERMANENT HYDROPHILIC POROUS COATINGS AND METHODS OF MAKING THEM

CROSS REFERENCE TO RELATED APPLICATIONS

This application is a continuation-in-part of U.S. patent application Ser. No. 12/019,973, entitled "Permanent hydrophilic porous coatings onto a substrate and porous membranes thereof", filed Jan. 25, 2008, which is herein incorporated by reference. This application is also a continuation-in-part of U.S. patent application Ser. No. 12/019,976, entitled "Processes for forming permanent hydrophilic porous coatings onto a substrate and porous membranes thereof", filed Jan. 25, 2008, which is also herein incorporated by reference.

BACKGROUND

The present disclosure generally relates to functionalized hydrophilic polymeric derivatives that are coated onto a base membrane and subsequently irradiated with a high-energy source to permanently form a hydrophilic surface.

Fluoropolymers such as polytetrafluoroethylene (PTFE) and expanded PTFE (ePTFE) are mechanically robust, high temperature, and chemically inert materials. These advantageous properties are derived from the high strength of the carbon-fluorine bond, which mitigates chemical degradation. Membranes are often formed of porous fluoropolymers because of its chemical inertness and mechanical stability. However, liquid water filtration is problematic due to the hydrophobic property of these types of fluoropolymers and may require treatment to impart hydrophilicity.

Hydrophilicity is defined as the property of being "water loving". Hydrophilicity is typically used to describe a property of a material or molecule, and typically refers to the ability of the material or molecule to participate in hydrogen bonding with water. Furthermore, hydrophilic materials are typically attracted to, or dissolve well within water. Hydrophilicity may be imparted to an ePTFE membrane by, for example, impregnation using a tetrafluoroethylene/vinyl alcohol copolymer. Such an approach leverages the chemical affinity of the perfluoropolymer in the coating material to the perfluoropolymer of the ePTFE. However, the affinity is sufficiently low that hydrophilicity may be temporary. Other methods include coating the membrane interior of continuous pores with a mixture of a fluoroaliphatic surfactant and a hydrophilic but water insoluble polyurethane. Such an approach may leverage the chemical affinity between the perfluoropolymers to form a two-layer system. In another approach, hydrophilicity of PTFE membrane may be produced by irradiation treatment of the PTFE powdered resin. The resin may be processed with a porogen and virgin PTFE powder to render a microporous PTFE membrane. However, none of the current processes provide permanent hydrophilic properties.

ePTFE membranes may be used for liquid water filtration, but require a pre-wet step generally with alcohols to enable water flow. This results in problematic production considerations as these membranes must be prewetted by membrane manufacturers and shipped wet to end-users. Such a membrane may dewet or dry. The drying of the membrane may render it ineffective and may necessitate, for example, undesirable shipping considerations (such as wet shipping). Other undesirable aspects may include economic considerations such as the need for special handling and sealable containers, and increased shipping weight, and the like.

Accordingly, it would be desirable to provide porous supports having permanent hydrophilic surfaces.

BRIEF DESCRIPTION

Disclosed herein are various membranes. In one embodiment, the membrane comprises a porous base membrane and a hydrophilic coating bonded to the porous base membrane. The hydrophilic coating comprises a hydrophilic additive and a hydrophilic polymer having an average molecular weight of greater than 2500 Daltons and that is derivatized with an electron beam (e-beam) reactive group, wherein the electron beam reactive group is configured to permanently bond the hydrophilic coating to the porous base membrane upon exposure to high energy irradiation. The hydrophilic polymer may be any of a polyvinyl alcohol, a polyvinyl alcohol-polyvinyl amine copolymer, a polyacrylic acid, a polyacrylate, a polyethylene glycol, a polyethylene amine, a polyvinyl amine, and/or derivatives thereof derivatized with an electron beam reactive group adapted to form a radical under high energy irradiation.

In another embodiment, the membrane comprises a porous base membrane comprising a fluoropolymer and a hydrophilic coating covalently grafted to the fluoropolymer. The hydrophilic coating comprises a hydrophilic polymer and a hydrophilic additive. The hydrophilic polymer comprises at least one of a polyvinyl alcohol, a polyvinyl alcohol-polyvinyl amine copolymer, a polyacrylic acid, a polyacrylate, a polyethylene glycol, a polyethylene amine, a polyvinyl amine, and/or derivatives thereof derivatized with an electron beam reactive group adapted to form a radical under high energy irradiation. The porous membrane has a flow rate of water greater than about 1 mL/min-cm$^2$ at 27 inches Hg pressure differential after 10 wet/dry cycles at room temperature.

In other embodiments, processes for forming permanently hydrophilic membranes are provided. One such process comprises applying a hydrophilic coating comprising a hydrophilic additive and a hydrophilic polymer having an average molecular weight of greater than 2500 Daltons and derivatized with an electron beam reactive group. The coated membrane is then irradiated with a high-energy source so that the e-beam reactive groups covalently graft to the porous base membrane to permanently form the hydrophilic surface on the porous base membrane.

The above described and other features are exemplified by the following figures and detailed description.

BRIEF DESCRIPTION OF THE DRAWINGS

Referring now to the figures, which are exemplary embodiments, and wherein the like elements are numbered alike.

DETAILED DESCRIPTION

Figure 1:
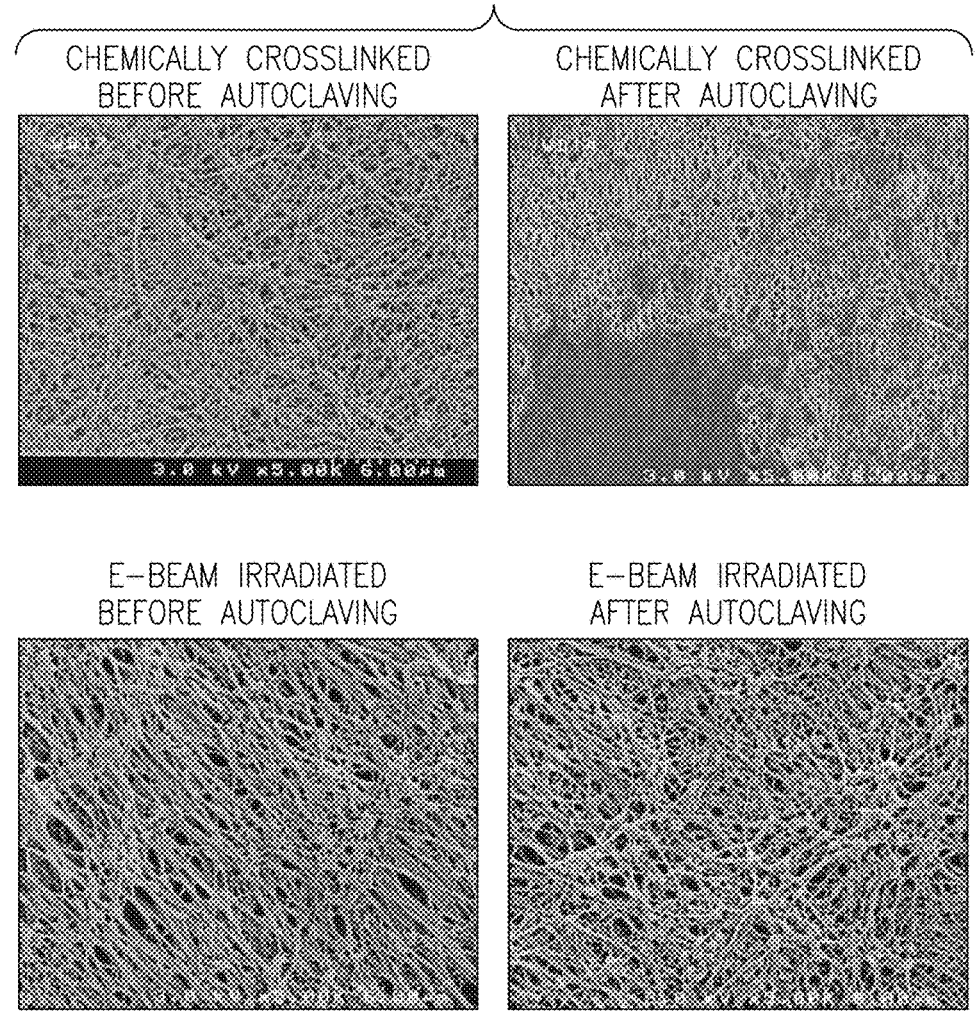
FIG. 1 are scanning electron micrographs illustrating chemically treated ePTFE membranes with crosslinked polyvinyl alcohol (PVA) before and after autoclaving, and an e-beam irradiated ePTFE membranes with e-beam functionalized polyvinyl alcohol (PVA) before and after autoclaving.

Disclosed herein are coatings comprising a hydrophilic polymer, e.g., polyvinyl alcohol and/or derivatives thereof bearing electron beam reactive groups and at least one hydrophilic additive. The coatings are advantageously coated onto a porous base membrane, e.g., comprising a fluoropolymer in some embodiments, and subsequently irradiated with electron beam to form a permanently hydrophilic surface. Advantageously, the coatings can be used to form a permanently hydrophilic porous membrane that exhibits high water flow, low extractables, and autoclavability. As used herein, permanence is defined as water wettability, consistent flow rates, and virtually no extractables over multiple wet-dry cycles and/or repeated steam sterilization cycles (autoclave) with virtually no weight loss or degradation of the membrane.

As previously discussed, fluoropolymers, such as ePTFE, are mechanically robust, high temperature, and chemically inert materials. These advantageous properties are derived from the high strength of the carbon-fluorine bond, which mitigates chemical degradation. Even though the carbon-fluorine bond dissociation energy is one of the strongest known, the Gibbs free energy values for radical formation on fluorocarbons are similar to those of carbon-hydrogen bonds. Because of this, high-energy radiation grafting of the functionalized polyvinyl alcohol derivatives onto the fluoropolymers base membranes by electron beam irradiation is possible.

In one embodiment, an initially hydrophobic base membrane may be coated with poly(vinyl alcohol)-based materials containing e-beam reactive moieties. As used herein, a base membrane may refer to an uncoated membrane, while the more general term of membrane may refer to a membrane that comprises an embodiment of the disclosure, unless language or context indicates otherwise.

Various materials can be used for forming the base membrane. Suitable fluoropolymers include, without limitation, ePTFE, polyvinylidene difluoride (PVDF), poly(tetrafluoroethylene-co-hexafluoropropylene) (FEP), poly(ethylene-alt-tetrafluoroethylene) (ETFE), polychlorotrifluoroethylene (PCTFE), poly(tetrafluoroethylene-co-perfluoropropyl vinyl ether) (PFA), poly(vinylidene fluoride-co-hexafluoropropylene) (PVDF-co-HFP), and polyvinyl fluoride (PVF). Other materials and methods can be used to form the membrane having an open pore structure include one or more of polyolefins (e.g., polyethylene, polypropylene, polymethylpentene, polystyrene, substituted polystyrenes, poly(vinyl chloride) (PVC), polyacrylonitriles), polyamide, polyester, polysulfone, polyether, acrylic and methacrylic polymers, polystyrene, polyurethane, polycarbonates, polyesters (e.g., polyethylene terephthalic ester, polybutylene terephthalic ester), polyether sulfones, polypropylene, polyethylene, polyphenylene sulfone, cellulosic polymer, polyphenylene oxide, polyamides (e.g., nylon, polyphenylene terephthalamide) and combinations of two or more thereof.

The base membrane may be rendered permeable by, for example, one or more of perforating, stretching, expanding, bubbling, or extracting the base membrane. Suitable methods of making the membrane also may include foaming, skiving or casting any of the suitable materials. In alternate embodiments, the membrane may be formed from woven or non-woven fibers.

In one embodiment, continuous pores may be produced. Suitable porosity may be in a range of greater than about 10 percent by volume. In one embodiment, the porosity may be in a range of from about 10 percent to about 20 percent, from about 20 percent to about 30 percent, from about 30 percent to about 40 percent, from about 40 percent to about 50 percent, from about 50 percent to about 60 percent, from about 60 percent to about 70 percent, from about 70 percent to about 80 percent, from about 80 percent to about 90 percent, or greater than about 90 percent by volume. Here and throughout the specification and claims, range limitations may be combined and/or interchanged. Such ranges are identified by their range limitations, and include all the sub-ranges contained therein unless context or language indicates otherwise.

Pore diameter may be uniform from pore to pore, and the pores may define a predetermined pattern. Alternatively, the pore diameter may differ from pore to pore, and the pores may define an irregular pattern. Suitable pore diameters may be less than about 50 micrometers. In one embodiment, an average pore diameter may be in a range of from about 50 micrometers to about 40 micrometers, from about 40 micrometers to about 30 micrometers, from about 30 micrometers to about 20 micrometers, from about 20 micrometers to about 10 micrometers, from about 10 micrometers to about 1 micrometer. In one embodiment, the average pore diameter may be less than about 1 micrometer, in a range of from about 1 micrometer to about 0.5 micrometers, from about 0.5 micrometers to about 0.25 micrometers, from about 0.25 micrometers to about 0.1 micrometers, or less than about 0.1 micrometers. In one embodiment, the average pore diameter may be in a range of from about 0.1 micrometers to about 0.01 micrometers.

In one embodiment, the base membrane may be a three-dimensional matrix or have a lattice type structure including plurality of nodes interconnected by a plurality of fibrils. Surfaces of the nodes and fibrils may define a plurality of pores in the membrane. The size of a fibril that has been at least partially sintered may be in a range of from about 0.05 micrometers to about 0.5 micrometers in diameter taken in a direction normal to the longitudinal extent of the fibril. The specific surface area of the porous membrane may be in a range of from about 0.5 square meters per gram of membrane material to about 110 square meters per gram of membrane material.

Surfaces of nodes and fibrils may define numerous interconnecting pores that extend through the membrane between opposite major side surfaces in a tortuous path. In one embodiment, the average effective pore size of pores in the membrane may be in the micrometer range. A suitable average effective pore size for pores in the membrane may be in a range of from about 0.01 micrometers to about 0.1 micrometers, from about 0.1 micrometers to about 5 microns, from about 5 micrometers to about 10 micrometers, or greater than about 10 micrometers such as an average pore size of 10 nm to 50 microns as measured by bubble point measurements.

In one embodiment, the base membrane may be made by extruding a mixture of fine powder particles and lubricant. The extrudate subsequently may be calendared. The calendared extrudate may be "expanded" or stretched in one or more directions, to form fibrils connecting nodes to define a three-dimensional matrix or lattice type of structure. "Expanded" means stretched beyond the elastic limit of the material to introduce permanent set or elongation to fibrils. The membrane may be heated or "sintered" to reduce and minimize residual stress in the membrane material by changing portions of the material from a crystalline state to an amorphous state. In one embodiment, the membrane may be unsintered or partially sintered as is appropriate for the contemplated end use of the membrane.

In one embodiment, the base membrane may define many interconnected pores that fluidly communicate with environments adjacent to the opposite facing major sides of the membrane. The propensity of the material of the membrane to permit a liquid material, for example, an aqueous polar liquid, to wet out and pass through pores may be expressed as a function of one or more properties. The properties may include the surface energy of the membrane, the surface tension of the liquid material, the relative contact angle between the material of the membrane and the liquid material, the size or effective flow area of pores, and the compatibility of the material of the membrane and the liquid material.

The base membrane is coated with a polyvinyl alcohol polymer and/or derivatives thereof. Suitable derivatives include, without limitation polyvinyl alcohol-polyvinyl amine copolymers (PVA-PVAm), PVAm, and the like. Other materials include, without limitation, functionalized polyarylenes containing amine, carboxylic acid, amide, hydroxyl moieties, and the like. In one embodiment, the average molecule weight of the polymer used for the hydrophilic coating is greater than about 2500 Daltons to 500,000 Daltons, with another embodiment of between 75,000 Daltons to 250,000 Daltons. Weight percent add-on or burn-off weight percents can be calculated to determine the amount of e-beam reactive coating applied to the base membrane. In one embodiment, the membrane has a weight percent add-on and/or burn-off weight percent of the permanently hydrophilic coating from 0.5 to 100 weight percent. In another embodiment, the membrane has a weight percent add-on and/or burn-off weight percent of the permanently hydrophilic coating from 3 to 15 weight percent.

Any e-beam reactive group that could be attached via a covalent linkage to PVA or the coating materials described above can be used in the present disclosure. An e-beam reactive group is defined as a moiety that can form a radical under high-energy irradiation. An e-beam reactive group generates free radicals on exposure to an electron beam source and facilitates crosslinking and grafting to other reactive substrates. The reagents that could be attached covalently to PVA or other coating materials may be monomers, oligomers, or polymers, or a combination of the above. In one embodiment, the e-beam reactive functional group comprises primary, secondary or tertiary aliphatic or cycloaliphatic radicals. In an alternate embodiment, the e-beam reactive functional group comprises secondary or tertiary aliphatic or cycloaliphatic radicals. Without being bound by any theory, it is believed that the secondary or tertiary aliphatic or cycloaliphatic radicals may generate stable free radicals on exposure to an electron beam source. In another alternate embodiment, the e-beam reactive functional group comprises aromatic radicals, e.g., benzyl radicals. Other e-beam reactive functionalities include methacrylates, acrylates, acrylamides, vinylketones, styrenics, vinyl ethers, vinyl- or allyl-containing reagents, benzyl radicals, and tertiary-carbon ($CHR_3$) based materials.

Suitable methacrylates, acrylates, and vinyl ketone reagents that can be covalently bound to the hydrophilic polymer include, without limitation, acryloyl chloride, (2E)-2-butenoyl chloride, maleic anhydride, 2(5H)-furanone, methyl acrylate, 5,6-dihydro-2H-pyran-2-one, ethyl acrylate, methyl crotonate, allyl acrylate, vinyl crotonate, 2-isocyanatoethyl methacrylate, methacrylic acid, methacrylic anhydride, methacryloyl chloride, glycidyl methacrylate, 2-ethylacryloyl chloride, 3-methylenedihydro-2(3H)-furanone, 3-methyl-2(5H)-furanone, methyl 2-methylacrylate, methyl trans-2-methoxyacrylate, citraconic anhydride, itaconic anhydride, methyl (2E)-2-methyl-2-butenoate, ethyl 2-methylacrylate, ethyl 2-cyanoacrylate, dimethylmaleic anhydride, allyl 2-methylacrylate, ethyl (2E)-2-methyl-2-butenoate, ethyl 2-ethylacrylate, methyl (2E)-2-methyl-2-pentenoate, 2-hydroxyethyl 2-methylacrylate, methyl 2-(1-hydroxyethyl)acrylate, [3-(methacryloyloxy)propyl] trimethoxysilane, 3-(diethoxymethylsilyl)propyl methacrylate, 3-(trichlorosilyl)propyl 2-methylacrylate, 3-(trimethoxysilyl)propyl 2-methylacrylate, 3-[tris(trimethylsiloxy)silyl]propyl methacrylate, 6-dihydro-1H-cyclopenta[c]furan-1,3(4H)-dione, methyl 2-cyano-3-methylcrotonate, trans-2,3-dimethylacrylic acid, N-(hydroxymethyl) acrylamide, and the like.

Suitable vinyl and allyl e-beam active reagents include, without limitation, allyl bromide, allyl chloride, diketene, 5-methylenedihydro-2(3H)-furanone, 3-methylenedihydro-2(3H)-furanone, 2-chloroethyl vinyl ether, 4-methoxy-2 (5H)-furanone, and the like.

Suitable isocyanate e-beam active reagents include, without limitation, vinyl isocyanate, allyl isocyanate, furfuryl isocyanate, 1-ethyl-4-isocyanatobenzene, 1-ethyl-3-isocyanatobenzene, 1-(isocyanatomethyl)-3-methylbenzene, 1-isocyanato-3,5-dimethylbenzene, 1-bromo-2-isocyanatoethane, (2-isocyanatoethyl)benzene, 1-(isocyanatomethyl)-4-methylbenzene, 1-(isocyanatomethyl)-3-methylbenzene, 1-(isocyanatomethyl)-2-methylbenzene, and the like.

Suitable styrenic e-beam active reagents include, without limitation, 3-vinylbenzaldehyde, 4-vinylbenzaldehyde, 4-vinylbenzyl chloride, trans-cinnamoyl chloride, phenylmaleic anhydride, 4-hydroxy-3-phenyl-2(5H)-furanone, and the like.

Suitable epoxide e-beam active reagents include, without limitation, glycidyl methacrylate, glycidyl vinyl ether, 2-(3-butenyl)oxirane, 3-vinyl-7-oxabicyclo[4.1.0]heptane, limonene oxide, and the like.

Examples of four hydrophilic polymers that have been reacted with monomers containing e-beam reactive functionalities are shown in Schemes 1-5 below. These reactions are exemplary and can be performed using a variety of different solvents, typically polar aprotic or polar protic solvents. For example, PVA-MMA (also known as PVA-UMA, where UMA refers to urethanoethyl methacrylate) was synthesized by reacting PVA with 2-isocyanatoethyl methacrylate in DMSO at 45° C. as shown in Scheme 1. The precipitation of PVA-MMA into a solution of isopropanol and diethyl ether showed that reactions of this type provided about 70% conversion. It should be apparent that the reaction has not been optimized and it is expected that conversion will increase upon doing so. As shown in schemes 2 and 3, the reaction of PVA with methacrylic anhydride or glycidyl methacrylate, respectively, in the presence of triethylamine provided about 90-97% conversion. PVA-MMA and PVA-UMA are alternative names for the same material, and these acronyms are used interchangeably herein.

PVA derivatives containing various levels of polyvinylamine can also be derivatized. As shown in scheme 4, PVA-PVAm-MMA was synthesized heterogeneously by reacting PVA-PVAm with 2-isocyanatoethyl methacrylate in THF. High conversions could be achieved with the more nucleophilic aliphatic amines. Finally, PVA-PVAm-mal was made homogeneously in water at elevated temperatures as shown in scheme 5.

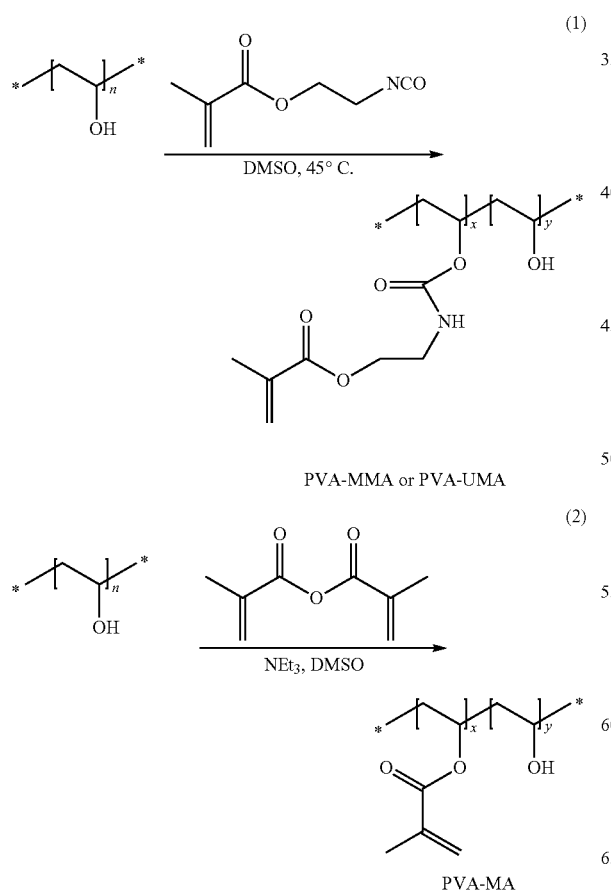

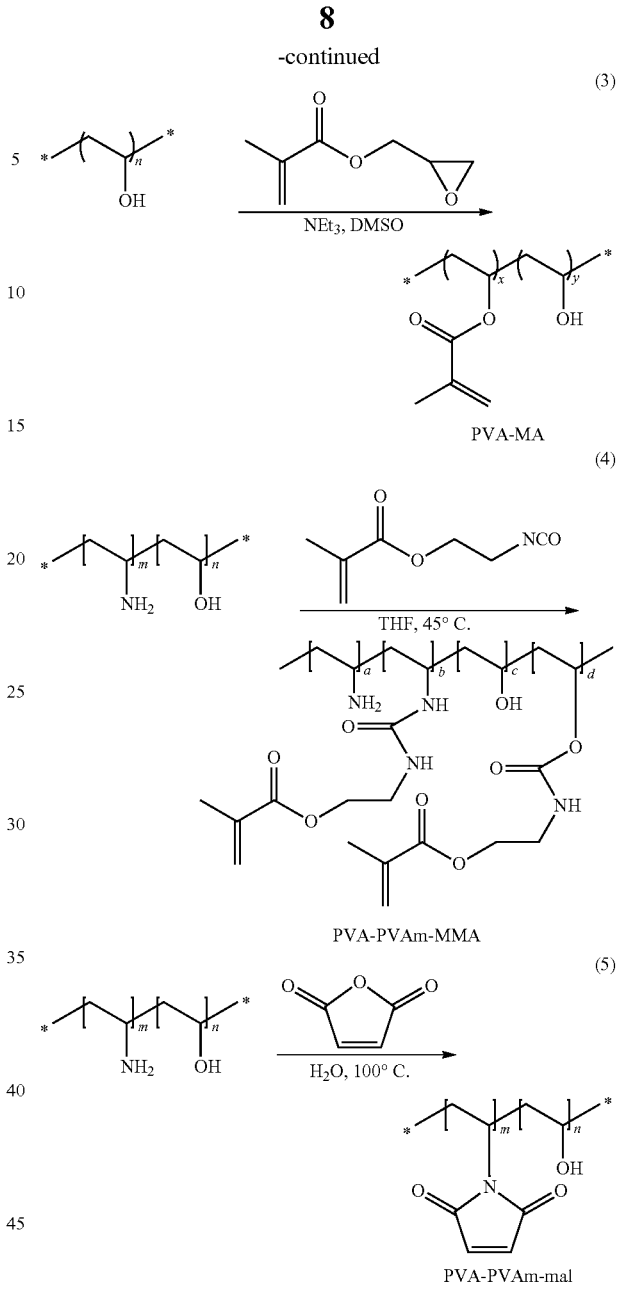

The hydrophilic coatings may also advantageously comprise an amount of a hydrophilic additive. As used herein, the phrase 'hydrophilic additive' is meant to indicate any substance capable of at least marginally enhancing the overall wettability of the porous membranes. In some embodiments, the hydrophilic additives may also bear an e-beam active group to aid in grafting to the base membrane. Examples of substances expected to do so include, but are not limited to, acrylates, diacrylates, triacrylates, or other multiacrylates, as well as acrylamides, vinyl ketones, styrenics, vinyl ethers, vinyl or allyl-containing moieties, benzyl carbons, tertiary carbons ($CHR_3$), or combinations of these. Desirably, the molecular weight of the hydrophilic additive(s) will be from about 250 g/mol to about 100,000 g/mol, inclusive of all subranges therebetween.

Diacrylates that may advantageously utilized as the hydrophilic additive include, but are not limited to, polyethylene glycol diacrylate (PEG-DA) shown below at (6), tetra(ethylene glycol) diacrylate, trimethylolpropane ethoxylate (1 EO/OH) methyl ether diacrylate, 1,3-butanediol diacrylate, glycerol 1,3-diglycerolate diacrylate, 1,6-hexanediol ethoxylate diacrylate (average $M_n$~314), bisphenol A ethoxylate diacrylate (average $M_n$~688, EO/phenol 4), tri(propylene glycol) glycerolate diacrylate, poly(propylene glycol) diacrylate (average $M_n$~900 or 4000). Exemplary triacrylates include trimethylolpropane ethoxylate triacrylate (average $M_n$~912) shown below at (7) and trimethylolpropane propoxylate triacrylate. Dimethylacrylates may also be utilized as the hydrophilic additive, and examples of these include, but are not limited to, poly(ethylene glycol) dimethacrylate (varying molecular weights), poly(propylene glycol) dimethacrylate, and 1,3-butanediol dimethacrylate. Particularly suitable hydrophilic additives include PEG-DA ((6), polyethylene glycol diacrylate) and trimethylolpropane ethoxylate triacrylate ((7), TMPET), shown below:

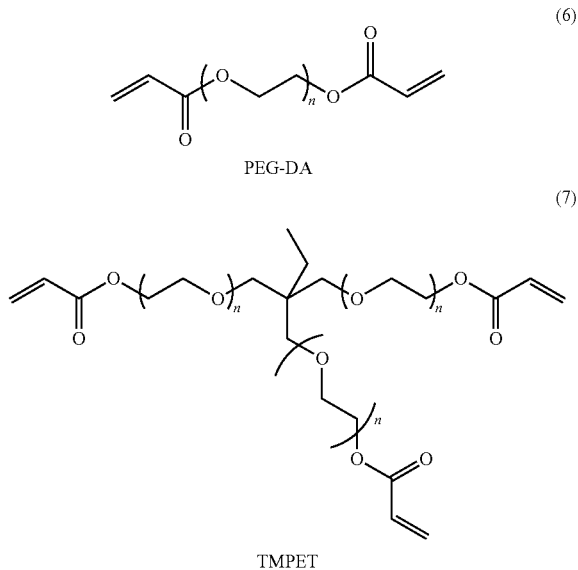

The hydrophilic additive(s) may be present in the coating in any amount. Desirably, the hydrophilic additive will be present in a minimum amount effective to enhance the ability of the coating to impart hydrophilicity to the membrane. Desirably, the amount of the hydrophilic additive utilized in the coating should not be an amount that may detrimentally impact other properties of the coating, including, for example, its coatability onto the desired porous membrane. Suitable ranges for the hydrophilic additive are expected to range from about 0.1 wt % to about 1000% wt %, or 1 wt % to about 100 wt %, or 2 wt % to about 90 wt %, or 3 wt % to about 80 wt %, or 4 wt % to about 70 wt %, or 5 wt % to about 60 wt %, etc., inclusive of all subranges therebetween, based upon the weight of the hydrophilic polymer used in the coating.

Suitable ranges for the total add-on weight of the hydrophilic additive and hydrophilic polymer based upon the weight of the base membrane are expected to range from about Suitable ranges for the total add-on weight of the hydrophilic additive and hydrophilic polymer based upon the weight of the base membrane are expected to range from about 0.1 wt % to about 100 wt %, or from about 0.1 wt % to about 90 wt %, or from about 0.1 wt % to about 80 wt %, or from about 0.1 wt % to about 70 wt %, or from about 0.1 wt % to about 60 wt %, or from about 0.1 wt % to about 50 wt %, or from about 0.1 wt % to about 40 wt %, or from about 0.1 wt % to about 30 wt %, or from about 0.1 wt % to about 20 wt %, or from about 0.1 wt % to about 10 wt %, or from about 0.2 wt % to about 7 wt %, or from about 0.5 wt % to about 5 wt %, or from about 0.75 wt % to about 4 wt % or from about 1 wt % to about 3 wt %, inclusive of all subranges therebetween.

The process for making a membrane with a permanent hydrophilic surface generally includes coating a hydrophobic porous base membrane with a hydrophilic coating comprising the hydrophilic polymer (e.g., polyvinyl alcohol or derivatives thereof) containing the e-beam reactive groups and the hydrophilic additive; drying the membrane under controlled conditions, optionally rewetting the membrane under controlled conditions, and then irradiating the composite with an electron beam at a dose between 0.1-2000 kilograys (kGy) in one embodiment, between 1-60 kGy in another embodiment, and between preferably 5-40 kGy in still another embodiment. Advantageously, it has been found that the resulting membrane can be repeatably autoclavable with no loss in hydrophilicity as measured in terms of extractable weight loss, which is an indication of its permanence and robustness, repeated water wettability, and water flow rates.

In some embodiments, the hydrophobic base membrane is fully wetted during coating to ensure uniform coating deposition of the hydrophilic polymer containing the e-beam reactive groups. Coating of the hydrophilic polymer is not intended to be limited to any particular process and the hydrophilic coating may be deposited by solution deposition, high pressure solution deposition, vacuum filtration, painting, gravure coating, air brushing, and the like. In this manner, the hydrophilic polymer and hydrophilic additive can be dissolved in polar aprotic and/or polar protic solvents. For example, the hydrophilic polymer and hydrophilic additive can be dissolved in water or an appropriate polar aprotic solvent and subsequently mixed with isopropyl alcohol.

Drying is generally at a temperature effective to remove the solvent and can be a temperature of about room temperature to about 150° C. The coating can be vacuum dried or air dried depending on the application. Spraying and/or soaking the coated membrane can be used to accomplish rewetting. Subsequent irradiation with e-beam can be done when dry or wet depending on the application. Wetting the coating/coated membrane generally includes a solvent capable of swelling the hydrophilic polymer. Suitable solvents will depend on the hydrophilic polymer and may include, among others, water, isopropanol, dimethylsulfoxide (DMSO), N-methylpyrrolidone (NMP), dimethyl acetamide (DMAc), tetrahydrofuran (THF), acetonitrile, and the like.

As an example, a process for making permanently hydrophilic ePTFE membranes is described below. PVA-MMA was first dissolved in deionized water at elevated temperatures. Using a blender for high shear rates, isopropanol was slowly added to the mixing solution. The mixing solution used to solubilize the e-beam reactive PVA was selected to completely wet the porous membrane. The desired hydrophilic additive is then added to the hydrophilic coating solution. Then, the PVA-MMA/hydrophilic additive solution was deposited on the ePTFE through standard solution deposition techniques. The ePTFE membrane was wetted out fully in the PVA-MMA/hydrophilic additive solution in water/isopropanol, and excess solution was removed to prevent the formation of a skin layer after drying. The coated membrane samples were fully dried in a constrained environment to ensure no pore constriction was observed. E-beam was then performed on coated, PVA-derived ePTFE membrane samples that were rewet with water. The coated membrane samples were sprayed with deionized water until complete wet out of the membranes was achieved (i.e., completely transparent) and excess water was removed from the membrane surface. It has been found that pooling of water will lead to decreased e-beam penetration and lack of permanence in the final product. The coated membrane samples were subjected to e-beam (125 kV, 40 kGy) under a nitrogen blanket once the oxygen concentration was less than 200 ppm. FIG. 1 illustrates scanning electron micrographs (SEMs) before and after autoclaving of chemically crosslinked PVA on ePTFE in comparison to the permanently hydrophilic ePTFE membranes prepared in accordance with the above process (i.e., e-beam irradiated). Autoclaving was performed for 30 minutes at 121° C. and 21 psi.

Manufacturers generally utilize heat sterilization cycles to destroy all types of microbes in their products; therefore, permanent autoclavability is a consideration for these materials. A widely-used method for heat sterilization is the autoclave. Autoclaves commonly use steam heated to about 121° C. at 15 psi above atmospheric pressure. The present disclosure is not intended to be limited to any particular autoclave process or apparatus.

The images of chemically cross-linked membrane samples before autoclaving and electron beam irradiated membrane samples before autoclaving in FIG. 1 both show fibrils and nodes that are uniformly coated and devoid of coating agglomeration. However, the SEM images following autoclave show coating agglomeration due to polymer migration in the case of the chemically crosslinked PVA (see FIG. 1). In contrast, the SEM image following autoclave of PVA-MMA(2.4) coated on ePTFE shows no coating agglomeration (see FIG. 1). This strongly suggests that the polymer is permanently attached to the porous substrate.

Membranes according to embodiments of the disclosure may have differing dimensions, some selected with reference to application-specific criteria. In one embodiment, the membrane may have a thickness in the direction of fluid flow in a range of less than about 10 micrometers. In another embodiment, the membrane may have a thickness in the direction of fluid flow in a range of greater than about 10 micrometers, for example, in a range of from about 10 micrometers to about 100 micrometers, from about 100 micrometers to about 1 millimeter, from about 1 millimeter to about 5 millimeters, or greater than about 5 millimeters. In one embodiment, the membrane may be formed from a plurality of differing layers.

Perpendicular to the direction of fluid flow, the membrane may have a width of greater than about 10 millimeters. In one embodiment, the membrane may have a width in a range of from about 10 millimeters to about 45 millimeters, from about 45 millimeters to about 50 millimeters, from about 50 millimeters to about 10 centimeters, from about 10 centimeters to about 100 centimeters, from about 100 centimeters to about 500 centimeters, from about 500 centimeters to about 1 meter, or greater than about 1 meter. The width may be a diameter of a circular area, or may be the distance to the nearest peripheral edge of a polygonal area. In one embodiment, the membrane may be rectangular, having a width in the meter range and an indeterminate length. That is, the membrane may be formed into a roll with the length determined by cutting the membrane at predetermined distances during a continuous formation operation.

A membrane prepared according to embodiments of the disclosure may have one or more predetermined properties. Such properties may include one or more of a wettability of a dry-shipped membrane, a wet/dry cycling ability, filtering of polar liquid or solution, flow of non-aqueous liquid or solution, flow and/or permanence under low pH conditions, flow and/or permanence under high pH conditions, flow and/or permanence at room temperature conditions, flow and/or permanence at elevated temperature conditions, flow and/or permanence at elevated pressures, transparency to energy of predetermined wavelengths, transparency to acoustic energy, or support for catalytic material. Permanence further refers to the ability of the coating material to maintain function in a continuing manner, for example, for more than 1 day or more than one cycle (wet/dry, hot/cold, high/low pH, and the like).

A property of at least one embodiment may include resistance to temperature excursions in a range of greater than about 100° C., for example, in autoclaving operations. In one embodiment, the temperature excursion may be in a range of from about 100° C. to about 125° C., from about 125° C. to about 135° C., or from about 135° C. to about 150° C. Optionally, the temperature excursion also may be at an elevated pressure relative to ambient. The temperature excursion may be for a period of greater than about 15 minutes.

Resistance to ultraviolet (UV) radiation may allow for sterilization of the membrane, in one embodiment, without loss of properties. Of note is an alternative embodiment in which crosslinking of the hydrophilic coating may be initiated or facilitated by exposure to an irradiation source, such as an ultraviolet source, where UV initiators may compete with UV absorbing compositions, if present.

Flow rate of fluid through the membrane may be dependent on one or more factors. The factors may include one or more of the physical and/or chemical properties of the membrane, the properties of the fluid (e.g., viscosity, pH, solute, and the like), environmental properties (e.g., temperature, pressure, and the like), and the like. In one embodiment, the membrane may be permeable to vapor rather than, or in addition to, fluid or liquid. A suitable vapor transmission rate, where present, may be in a range of less than about 1000 grams per square meter per day ($g/m^2/day$), from about 1000 $g/m^2/day$ to about 1500 $g/m^2/day$, from about 1500 $g/m^2/day$ to about 2000 $g/m^2/day$, or greater than about 2000 $g/m^2/day$. In one embodiment, the membrane may be selectively impermeable to liquid or fluid, while remaining permeable to vapor.

Advantageously, the coated membranes described herein can be employed in numerous applications, including but not limited to, liquid filtration, water purification, chemical separations, charged ultrafiltration membranes, protein sequestration/purification, waste treatment membranes, biomedical applications, pervaporation, gas separation, the fuel cell industry, electrolysis, dialysis, cation-exchange resins, batteries, reverse osmosis, dielectrics/capacitors, industrial electrochemistry, $SO_2$ electrolysis, chloralkali production, and super acid catalysis. As membranes, the composite compositions wet out completely, and demonstrate high fluxes of water and essentially no extractables over many autoclave cycles.

The following examples are presented for illustrative purposes only, and are not intended to limit the scope of the invention.

EXAMPLES

In the following examples, all of the poly(vinyl alcohol) and PVA-PVAm copolymers were purchased from Celanese Ltd.; Celvol 165, Celvol 107, PVA-PVAm L6 and PVA-PVAm L12 were used as received, unless otherwise noted. Celvol 165 and Celvol 107 have weight average molecular weights of about 146-186 kg/mol and 31-50 kg/mol, respectively. Anhydrous DMSO, 4-(dimethylamino)pyridine, triethylamine, 2-isocyanatoethyl methacrylate, maleic anhydride, glycidyl methacrylate, and methacrylic anhydride were purchased from Aldrich and used as received. NMR spectra were recorded on a Bruker Avance 400 ($^1$H, 400 MHz) spectrometer and referenced versus residual solvent shifts.

Weight percent add-on or burn-off weight percents were calculated to determine the amount of e-beam reactive coating applied to the base membrane. Weight percent add-ons were calculated by: 100*(Membrane weight after coating-membrane weight before coating)/membrane weight before coating. Burn-off weight percents were determined by the following: the e-beam reactive coating was selectively removed from the porous substrate by thermal degradation at 400° F. for 20 minutes. Burn-off weight percents were calculated by: 100*(Membrane weight before burn-off–membrane weight after burn-off)/membrane weight after burn-off).

Vacuum filtration was performed using a 47 mm diameter Millipore glass filter vacuum filtration apparatus. Flow rates of water were performed at 27 inches Hg pressure differential and reported in mL/min-cm$^2$.

E-beam irradiation experiments were performed with equipment from Advanced Electron Beams Inc. in Wilmington, Mass. 125 kV was used as a standard voltage (80-150 kV operating voltage range), unless otherwise noted. The unit was capable of giving a 50 kGy dose with each pass; higher dosages were obtained by using multiple passes. E-beam dosages were administered from 0 to 100 kGy. A kilogray dosage is defined as the energy absorbed by a given mass of substrate (1 kJ/kg; 1 kGy=0.1 MRad) and may be calculated as follows: MRad=(I*K)/line speed, where I is current (mA, K is the e-beam coefficient, and line speed is the rate the coated membrane passes through the e-beam (ft/min).

All the experiments were done under a nitrogen blanket with oxygen concentration of less than 200 ppm unless otherwise noted. Extractables testing was done according to the following procedure. The membranes were dried at 70° C. for 1 hour to remove residual volatiles and weighed using a microbalance. Membranes were confined in a mesh screen and soaked in stirring water at 80° C. for 24 hours. The membranes were then dried at 70° C. for 1 hour and weighed using a microbalance. Percent extractables were determined by the weight percentage difference between the dried samples before and after extraction. Autoclaving was done using a Steris Sterilizer, Amsco Century SV-148H Prevac Steam Sterilizer at 121° C. and 21 psi for 30 minutes.

Example 1

In this example, functionalized PVA was synthesized and is referred to as PVA-MMA(2.4)-high MW. PVA (20.1 g, 456 mmol, Celvol 165 from Celanese Ltd.) was added to a 500 mL three-necked round-bottom flask with anhydrous DMSO (175 mL) and stirred vigorously at 75° C. until a homogeneous solution was achieved. The reaction was cooled to 40° C., and 2-isocyanatoethyl methacrylate (3.53 g, 22.8 mmol) was added slowly to the vigorously stirring solution. The viscous solution was stirred for 24 hours, and then cooled to room temperature. The polymer was precipitated into a 5:1 mixture of isopropanol:ether (800 mL total). The flocculent white solid was dried under vacuum at room temperature. $^1$H NMR showed approximately 2.4% of the repeat units contained the graftable methacrylate linkage (21.5 g, 91% yield, 42% conversion). $^1$H NMR (D$_2$O, 400 MHz) δ 6.13 (1H, bs, CHH=CMe), 5.72 (1H, bs, CHH=CMe), 4.24 (2H, bm, CH$_2$CH$_2$), 4.1-3.5 (43H, bm, CH of PVA), 3.45 (2H, bm, CH$_2$CH$_2$), 1.91 (3H, bs, CHH=CMe), 1.9-1.4 (82H, bm, CH$_2$ of PVA).

Example 2

In this example, functionalized PVA was synthesized and is referred to as PVA-MMA (5.0)-high MW. PVA (20.1 g, 456 mmol, Celvol 165 from Celanese Ltd.) was added to a 500 mL, three-necked round-bottom flask with anhydrous DMSO (150 mL) and stirred vigorously at 95° C. until a homogeneous solution was achieved. The reaction was cooled to room temperature, and 2-isocyanatoethyl methacrylate (10.1 g, 65.1 mmol) was added slowly to the vigorously stirring solution in an ice bath to control any exotherm. The viscous solution was stirred for 24 hours at 40° C., and then cooled to room temperature. The polymer was precipitated into a 3:1 mixture of isopropanol:ether (700 mL total). The flocculent white solid was dried under vacuum at room temperature. $^1$H NMR showed approximately 5% of the repeat units contained the graftable methacrylate linkage (24.0 g, 80% yield, 39% conversion). $^1$H NMR (DMSO-d$_6$, 400 MHz) δ 6.13 (1H, bs, CHH=CMe), 5.72 (1H, bs, CHH=CMe), 4.95 (1H, bm, OH of PVA), 4.69 (4H, bm, OH of PVA), 4.46 (9H, bm, OH of PVA), 4.36 (2H, bm, OH of PVA), 4.21 (6H, bm, OH of PVA), 4.07 (2H, bm, CH$_2$CH$_2$), 3.9-3.6 (20H, CH of PVA, 3.25 (2H, bm, CH$_2$CH$_2$), 1.88 (3H, bs, CHH=CMe), 1.8-1.2 (40H, bm, CH$_2$ of PVA).

Example 3

In this example, functionalized PVA was synthesized and is referred to as PVA-MMA (1.4)-high MW. PVA (20.0 g, 454 mmol, Celvol 165 from Celanese Ltd.) was added to a 500 mL round-bottom flask with DMSO (200 mL) and stirred vigorously at 75° C. until a homogeneous solution was achieved. The reaction was cooled to 45° C., and 4-(dimethylamino)pyridine (2.22 g, 18.2 mmol) and 2-isocyanatoethyl methacrylate (1.41 g, 9.09 mol) was added slowly to the vigorously stirring solution. The viscous solution was stirred for 24 hours, and then cooled to room temperature. The polymer was precipitated into isopropanol (1200 mL total). The flocculent white solid was dried under vacuum at 40° C. $^1$H NMR showed approximately 1.4% of the repeat units contained the graftable methacrylate linkage (20.8 g, 97% yield, 70% conversion). $^1$H NMR (DMSO-d$_6$, 400 MHz) δ 6.07 (1H, bs, CHH=CMe), 5.67 (1H, bs, CHH=CMe), 4.95 (1H, bm, OH of PVA), 4.67 (14H, bm, OH of PVA), 4.47 (36H, bm, OH of PVA), 4.22 (23H, bm, OH of PVA), 4.07 (2H, bm, CH$_2$CH$_2$), 3.9-3.6 (72H, CH of PVA, 3.25 (2H, bm, CH$_2$CH$_2$), 1.88 (3H, bs, CHH=CMe), 1.8-1.2 (152H, bm, CH$_2$ of PVA).

Example 4

In this example, functionalized PVA was synthesized and is referred to as PVA-MA (3.8)-high MW. PVA (11.2 g, 254 mmol, Celvol 165 from Celanese Ltd.) was added to a 500 mL, three-necked round-bottom flask with anhydrous DMSO (200 mL) and stirred vigorously at 50° C. until a homogeneous solution was achieved. The reaction was cooled to room temperature, and triethylamine (2.50 g, 24.7 mmol) and methacrylic anhydride (1.98 g, 12.8 mmol) was added slowly to the vigorously stirring solution in an ice bath to control any exotherm. The viscous solution was stirred for 24 hours at room temperature. The polymer was precipitated into a 3:1 mixture of isopropanol:ether (700 mL total). The rubbery, off-white solid was dried under vacuum at room temperature. $^1$H NMR showed approximately 3.8% of the repeat units contained the graftable methacrylate linkage (11.5 g, 95% yield, 80% conversion). $^1$H NMR (DMSO-d$_6$, 400 MHz) δ 5.99 (1H, bs, CHH=CMe), 5.62 (1H, bs, CHH=CMe), 5.19 (1H, bm, OH of PVA), 4.67 (5H, bm, OH of PVA), 4.46 (1H, bm, OH of PVA), 4.36 (5H, bm, OH of PVA), 4.21 (7H, bm, OH of PVA), 4.0-3.6 (26H, bm, CH of PVA), 1.87 (3H, bs, CHH=CMe), 1.8-1.2 (50H, bm, CH$_2$ of PVA).

Example 5

In this example, functionalized PVA was synthesized and is referred to as PVA-MA (3.0)-high MW. PVA (20.0 g, 454 mmol, Celvol 165 from Celanese Ltd.) and DMSO (200 g) was added to a 500 mL, three-necked round-bottom flask equipped with a mechanical stirrer and stirred vigorously at 95° C. until a homogeneous solution was achieved. The reaction was cooled to 70° C. and triethylamine (2.85 g, 28.2 mmol) was added. Upon complete dissolution, glycidyl methacrylate (2.00 g, 14.1 mmol) was added slowly to the vigorously stirring solution. The viscous solution was stirred for 2 hours at 70° C. and cooled to 50° C. for 2 hours. The polymer was precipitated into a vigorously stirring solution of isopropanol (1.2 L) using a blender. The flocculent white solid was filtered, washed with isopropanol (500 mL) and methanol (750 mL), and dried under vacuum overnight at 40° C. to remove residual solvents. $^1$H NMR spectroscopy showed that approximately 3.0% of the repeat units contained the graftable methacrylate linkage (20.5 g, 98% yield, 97% conversion). $^1$H NMR (DMSO-d$_6$, 400 MHz) δ 5.99 (1H, bs, CHH=CMe), 5.63 (1H, bs, CHH=CMe), 5.19 (1H, bm, OH of PVA), 4.67 (6H, bm, OH of PVA), 4.46 (17H, bm, OH of PVA), 4.23 (10H, bm, OH of PVA), 4.0-3.6 (33H, bm, CH of PVA), 1.87 (3H, bs, CHH=CMe), 1.8-1.2 (71H, bm, CH$_2$ of PVA).

Example 6

In this example, functionalized PVA was synthesized and is referred to as PVA-MA (2.5)-high MW. PVA (20.0 g, 454 mmol, Celvol 165 from Celanese Ltd.) and DMSO (200 g) was added to a 500 mL, three-necked round-bottom flask equipped with a mechanical stirrer and stirred vigorously at 95° C. until a homogeneous solution was achieved. The reaction was cooled to 70° C. and triethylamine (2.48 g, 24.5 mmol) was added. Upon complete dissolution, glycidyl methacrylate (1.74 g, 12.3 mmol) was added slowly to the vigorously stirring solution. The viscous solution was stirred for 2 hours at 70° C. and cooled to 50° C. for 2 hours. The polymer was precipitated into a vigorously stirring solution of isopropanol (1.2 L) using a blender. The flocculent white solid was filtered, washed with isopropanol (500 mL) and methanol (750 mL), and dried under vacuum overnight at 40° C. to remove residual solvents. $^1$H NMR spectroscopy showed approximately 2.5% of the repeat units contained the graftable methacrylate linkage (20.3 g, 97% yield, 93% conversion). $^1$H NMR (DMSO-d$_6$, 400 MHz) δ 5.99 (1H, bs, CHH=CMe), 5.62 (1H, bs, CHH=CMe), 5.19 (1H, bm, OH of PVA), 4.68 (8H, bm, OH of PVA), 4.48 (19H, bm, OH of PVA), 4.23 (12H, bm, OH of PVA), 4.0-3.6 (40H, bm, CH of PVA), 1.87 (3H, bs, CHH=CMe), 1.8-1.2 (84H, bm, CH$_2$ of PVA).

Example 7

In this example, functionalized PVA was synthesized and is referred to as PVA-MA (2.0)-high MW. PVA (20.0 g, 454 mmol, Celvol 165 from Celanese Ltd.) and DMSO (202 g) was added to a 500 mL, three-necked round-bottom flask equipped with a mechanical stirrer and stirred vigorously at 95° C. until a homogeneous solution was achieved. The reaction was cooled to 70° C. and triethylamine (1.94 g, 19.2 mmol) was added. Upon complete dissolution, glycidyl methacrylate (1.37 g, 9.62 mmol) was added slowly to the vigorously stirring solution. The viscous solution was stirred for 2 hours at 70° C. and cooled to 50° C. for 2 hours. The polymer was precipitated into a vigorously stirring solution of isopropanol (1.2 L) using a blender. The flocculent white solid was filtered, washed with isopropanol (500 mL) and methanol (750 mL), and dried under vacuum overnight at 40° C. to remove residual solvents. $^1$H NMR spectroscopy showed approximately 2.0% of the repeat units contained the graftable methacrylate linkage (20.0 g, 97% yield, 95% conversion). $^1$H NMR (DMSO-d$_6$, 400 MHz) δ 5.99 (1H, bs, CHH=CMe), 5.62 (1H, bs, CHH=CMe), 5.19 (1H, bm, OH of PVA), 4.67 (10H, bm, OH of PVA), 4.47 (24H, bm, OH of PVA), 4.22 (14H, bm, OH of PVA), 4.0-3.6 (50H, bm, CH of PVA), 1.87 (3H, bs, CHH=CMe), 1.8-1.2 (103H, bm, CH$_2$ of PVA).

Example 8

In this example, functionalized PVA was synthesized and is referred to as PVA-MMA (3)-low MW. PVA (50.2 g, 1.14 mol, Celvol 107 from Celanese Ltd.) was added to a 1 L round-bottom flask with anhydrous DMSO (225 mL) and stirred vigorously at 75° C. until a homogeneous solution was achieved. The reaction was cooled to 45° C., and 2-isocyanatoethyl methacrylate (10.4 g, 0.067 mol) was added slowly to the vigorously stirring solution. The viscous solution was stirred for 24 hours, then cooled to room temperature. The polymer was precipitated into a 9:1 mixture of isopropanol:ether (1 L total). The flocculent white solid was dried under vacuum at room temperature. $^1$H NMR showed approximately 3% of the repeat units contained the graftable methacrylate linkage (54.8 g, 90% yield, 44% conversion). $^1$H NMR (D$_2$O, 400 MHz) δ 6.14 (1H, bs, CHH=CMe), 6.14 (1H, bs, CHH=CMe), 4.24 (2H, bm, CH$_2$CH$_2$), 4.1-3.5 (34H, bm, CH of PVA), 3.45 (2H, bm, CH$_2$CH$_2$), 1.93 (3H, bs, CHH=CMe), 1.9-1.4 (63H, bm, CH$_2$ of PVA).

Example 9

In this example, functionalized PVA was synthesized and is referred to as PVA-PVAm-mal. PVA-PVAm (5.01 g, 114 mmol, PVOH(88)-PVAm(12) L12 from Celanese Ltd.) was added to a 500 mL, three-necked round-bottom flask with deionized water (55 mL) and stirred at 100° C. until a homogeneous solution was achieved. Maleic anhydride (1.34 g, 13.7 mmol) was dissolved in THF (4 mL) and added slowly to the vigorously stirring solution. The solution initially became cloudy, and then turned clear over the course of 20 minutes. The viscous solution was stirred for 24 hours at reflux. The polymer was precipitated into isopropanol (400 mL), redissolved in a minimal amount of water, and reprecipitated in isopropanol (400 mL). The white solid was dried under vacuum at room temperature. $^1$H NMR showed approximately 6% of the repeat units contained the graftable maleic imide linkage (5.34 g, 88% yield, 50% conversion). $^1$H NMR (D$_2$O, 400 MHz) δ 6.29 (2H, bs, CHH=CMe), 4.1-3.5 (18H, CH of PVA-PVAm), 2.0-1.4 (34H, CH$_2$ of PVA-PVAm).

Example 10

In this example, functionalized PVA was synthesized and is referred to as PVA-PVAm-MMA. PVA-PVAm (5.02 g, 114 mmol, PVOH(94)-PVAm(6) L6 from Celanese Ltd.) was added to a 250 mL, three-necked round-bottom flask with THF (50 mL) and refluxed vigorously to swell the polymer. The reaction was cooled to room temperature, and 2-isocyanatoethyl methacrylate (1.06 g, 6.83 mmol) was added slowly to the stirring mixture. The heterogeneous mixture was stirred for 24 hours, and then the volatiles were removed in vacuo. The white polymer was washed with copious amounts of hexane and dried under vacuum at room temperature. $^1$H NMR showed approximately 2% of the repeat units (12% urethane (PVA):88% urea (PVAm)) contained the graftable methacrylate linkage (5.40 g, 89% yield, 38% conversion). $^1$H NMR (DMSO-d$_6$, 400 MHz) δ 6.12 (0.13H, bs, CHH=CMe-urethane), 5.71 (0.13H, bs, CHH=CMe-urethane), 5.64 (1H, bm, CHH=CMe-urea), 5.33 (0.13H, bm, CHH=CMe-urea), 4.24 (0.26H, bm, CH$_2$CH$_2$-urethane), 4.1-3.5 (51H, bm, CH of PVA-PVAm), 3.61 (2H, t, CH$_2$CH$_2$-urea), 4.24 (0.26H, bm, CH$_2$CH$_2$-urethane), 3.24 (2H, bm, CH$_2$CH$_2$-urea), 1.91 (3H, bs, CHH=CMe), 1.9-1.4 (82H, bm, CH$_2$ of PVA-PVAm).

Example 11

In this example, ePTFE (QM702 series membrane from GE Energy) was coated with PVA-MMA (2.4)-high MW, PVA-MMA (1.4)-high MW, PVA-MA (3.0)-high MW, PVA-MA (2.5)-high MW, PVA-MA (2.0)-high MW, PVA-MMA (3)-low MW, PVA-PVAm-mal, and PVA-PVAm-MMA which had been prepared in accordance with Examples 1, 3, and 5-10, respectively. Using PVA-MMA (2.4) as an example, PVA-MMA (2.4) (2.00 g) was dissolved in deionized water (98 g) at 50° C. Using a blender for high shear rates, isopropanol (80 mL) was slowly added to the mixing solution. Evaporation of the volatiles showed a 1.22 wt % PVA-MMA (2.4) solution (theoretical wt %=1.23%). BHA ePTFE membrane, based on BHA ePTFE Part #QM702, was wetted out fully in the PVA-MMA(2.4) solution and excess solution was removed using a squeegee. The transparent coated ePTFE samples were constrained in polypropylene hoops and allowed to air dry. Weight percent add-ons were determined to be between 6-8 wt %. Burn-off weight percents were also determined to be between 6-8 wt %. Coatings for PVA-MMA (1.4)-high MW, PVA-MMA (3)-low MW, PVA-PVAm-mal, and PVA-PVAm-MMA were performed in a similar fashion. Coatings for PVA-MA(3.0)-high MW, PVA-MA (2.5)-high MW, and PVA-MA (2.0)-high MW were also performed in a similar fashion, although isopropanol concentrations were increased to 50% of the total coating solution concentration.

Example 12

In this example, ePTFE (QM702 series membrane from GE Energy) was coated with PVA-MMA (5.0)-high MW, which had been prepared in accordance with Example 2. PVA-MMA (5.0) (4.00 g) was dissolved in DMSO (10 g) and deionized water (86 g) at 50° C. Using a blender for high shear rates, isopropanol (100 mL) was slowly added to the mixing solution. Evaporation of the volatiles showed a 2.2 wt % PVA-MMA (5.0) solution (theoretical wt %=2.24%). BHA ePTFE membrane, based on BHA ePTFE Part #QM702, was wetted out fully in the PVA-MMA (5.0) solution and excess solution was removed by squeegee. The transparent coated ePTFE samples were constrained in polypropylene hoops and allowed to air dry. Weight percent add-ons were determined to be between 10-11 wt %.

Example 13

In this example, ePTFE (QM702 series membrane from GE Energy) was coated with PVA-MA (3.8), which had been prepared in accordance with Example 4. PVA-MA (3.8) (4.00 g) was dissolved in DMSO (96 g) at 50° C. Using a blender for high shear rates, isopropanol (250 mL) was slowly added to the mixing solution. Evaporation of the volatiles showed a 1.3 wt % PVA-MA (3.8) solution (theoretical wt %=1.35%). BHA ePTFE membrane, based on BHA ePTFE Part #QM702, was wetted out fully in the PVA-MA (3.8) solution and excess solution was squeegeed off. The transparent coated ePTFE samples were constrained in polypropylene hoops and allowed to air dry. The coating was repeated to increase the weight percent add-ons. Final weight percent add-ons were determined to be between 10-11 wt %.

Example 14

In this example, coated PVA-derived ePTFE samples were e-beamed in a constrained environment (i.e., polypropylene hoops) by one of two methodologies. 1) Dry: samples were placed in the AEB e-beam apparatus and placed under a nitrogen blanket until the oxygen concentration was less than 200 ppm. At a standard voltage of 125 kV, the dry sample was exposed to the desired dosage. 2) Wet: The samples were sprayed with deionized water until complete wet out of the membranes was achieved (i.e., completely transparent). Excess water was removed by squeegee, wipe, or other standard technique to ensure no pooling of water occurred on the membrane. The samples were placed in the AEB e-beam apparatus and placed under a nitrogen blanket until the oxygen concentration was less than 200 ppm. At a standard voltage of 125 kV, the wet sample was exposed to the desired dosage.

Flow rates of the sample membranes prepared in accordance with Examples 11-13 after e-beam and after autoclaving are provided in Table 1 below. Celvol 165 (high molecular weight of ~146-186 kg/mol), super hydrolyzed polyvinyl alcohol from Celanese Ltd.) is a control. Flow rates were measured in mL/min-cm$^2$ @ 27" Hg. Weight percent add-ons were calculated by: 100*(Membrane weight after coating-membrane weight before coating)/membrane weight before coating.

TABLE 1

| Membrane Coated with Sample # | Sample | Wt % coating solution | Wt % Add-on | Dosage (kGy) | After e-Beam Flow rate | After Autoclave Flow rate |
|---|---|---|---|---|---|---|
| 2 | PVA-MMA (5) | 2.2 | 10.0% | 0 | 9.45 | 0.11 |
| 2 | PVA-MMA (5) | 2.2 | 11.0% | 20[a] | 19.3 | 0.53 |
| 2 | PVA-MMA (5) | 2.2 | 11.1% | 40[a] | 15.7 | 5.8 |
| 2 | PVA-MMA (5) | 2.2 | 11.0% | 20/20[a] | 18.5 | 7.6 |
| 1 | PVA-MMA (2.4) | 1.2 | 6.0% | 0[a] | 4.70 | 0 |
| 1 | PVA-MMA (2.4) | 1.2 | 5.8% | 20[a] | 10.5 | 0.2 |
| 1 | PVA-MMA (2.4) | 1.2 | 5.4% | 40[a] | 9.8 | 4.2 |
| 1 | PVA-MMA (2.4) | 1.2 | 5.4% | 60[a] | 12.9 | 2.2 |
| n.a. | Celvol 165 | 1.2 | 5.9% | 40[a] | 11.5 | 0 |
| n.a. | Celvol 165 | 1.2 | 5.9% | 40[b] | n.d. | 0 |
| 1 | PVA-MMA (2.4) | 1.1 | 7.3[c] | 5[b] | 19.8[c] | 60.0[c] |
| 1 | PVA-MMA (2.4) | 1.1 | 6.0[d] | 10[b] | 25.1[d] | 59.2[d] |
| 1 | PVA-MMA (2.4) | 1.1 | 6.6 | 40[b] | 40.4 | 74.0 |
| 8 | PVA-MMA (3) | 1.2 | 4.4% | 40[b] | 12.9 | 11.4 |
| 8 | PVA-MMA (3) | 1.2[e] | 14.3% | 40[b] | 22.7 | 28.6 |
| 4 | PVA-MA (3.8) | 1.3 | 6.6% | 40[b] | 12.4 | 23.5 |
| 4 | PVA-MA (3.8) | 1.3 | 11.2% | 40[b] | 36.6 | 23.5 |
| 5 | PVA-MA (3.0) | 1.2 | 7.2[c] | 25[b] | 19.5[c] | 46.8[c] |
| 5 | PVA-MA (3.0) | 1.2 | 6.9[c] | 40[b] | 18.9[c] | 41.8[c] |
| 6 | PVA-MA (2.5) | 0.8 | 4.7[c] | 40[b] | 25.0[c] | 39.5[c] |
| 6 | PVA-MA (2.5) | 1.0 | 5.3[c] | 40[b] | 33.2[c] | 59.5[c] |
| 6 | PVA-MA (2.5) | 1.0 | 5.7[f] | 25[b] | 27.3[f] | 49.7[f] |
| 6 | PVA-MA (2.5) | 1.2 | 7.3[c] | 40[b] | 21.2[c] | 49.0[c] |
| 7 | PVA-MA (2.0) | 1.0 | 5.5[c] | 25[b] | 27.2[c] | 34.3[c] |
| 7 | PVA-MA (2.0) | 1.2 | 6.6[c] | 40[b] | 32.2[c] | 45.3[c] |

[a] dry samples were e-beam irradiated
[b] samples wet with deionized water before e-beam exposure
[c] average of three samples
[d] average of two samples
[e] coating repeated three times to increase add-on wt %
[f] average of six samples
n.a. = not applicable;
n.d. = not determined As shown in Table 1, flow rate for the Celvol 165 control was the least for all of the samples tested. Wetting the ePTFE coated with any of the hydrophilic coatings prior to e-beam exposure greatly improved flow rate after autoclaving and provided greater permanence.

Example 15

In this example, coated, PVA-derived ePTFE samples were e-beamed in a constrained environment (i.e., polypropylene hoops) by one of two methodologies: dry or wet. In all examined cases, the latter of the two methodologies proved to be the more effective technique for ensuring complete autoclavability. Autoclavability is defined as the membrane property of transparent wet out following an autoclave cycle. The wet methodology was performed as follows: the samples were sprayed with deionized water until complete wet out of the membranes was achieved (i.e., completely transparent). Excess water was removed by squeegee, wipe, or other standard technique to ensure no pooling of water occurred on the membrane. The samples were placed in the AEB e-beam apparatus and placed under a nitrogen blanket until the oxygen concentration was less than 200 ppm (although presence of oxygen does not affect e-beam performance). At a standard voltage of 125 kV, the wet sample was exposed to the desired dosage. The results are shown in FIG. 2.

Figure 2:
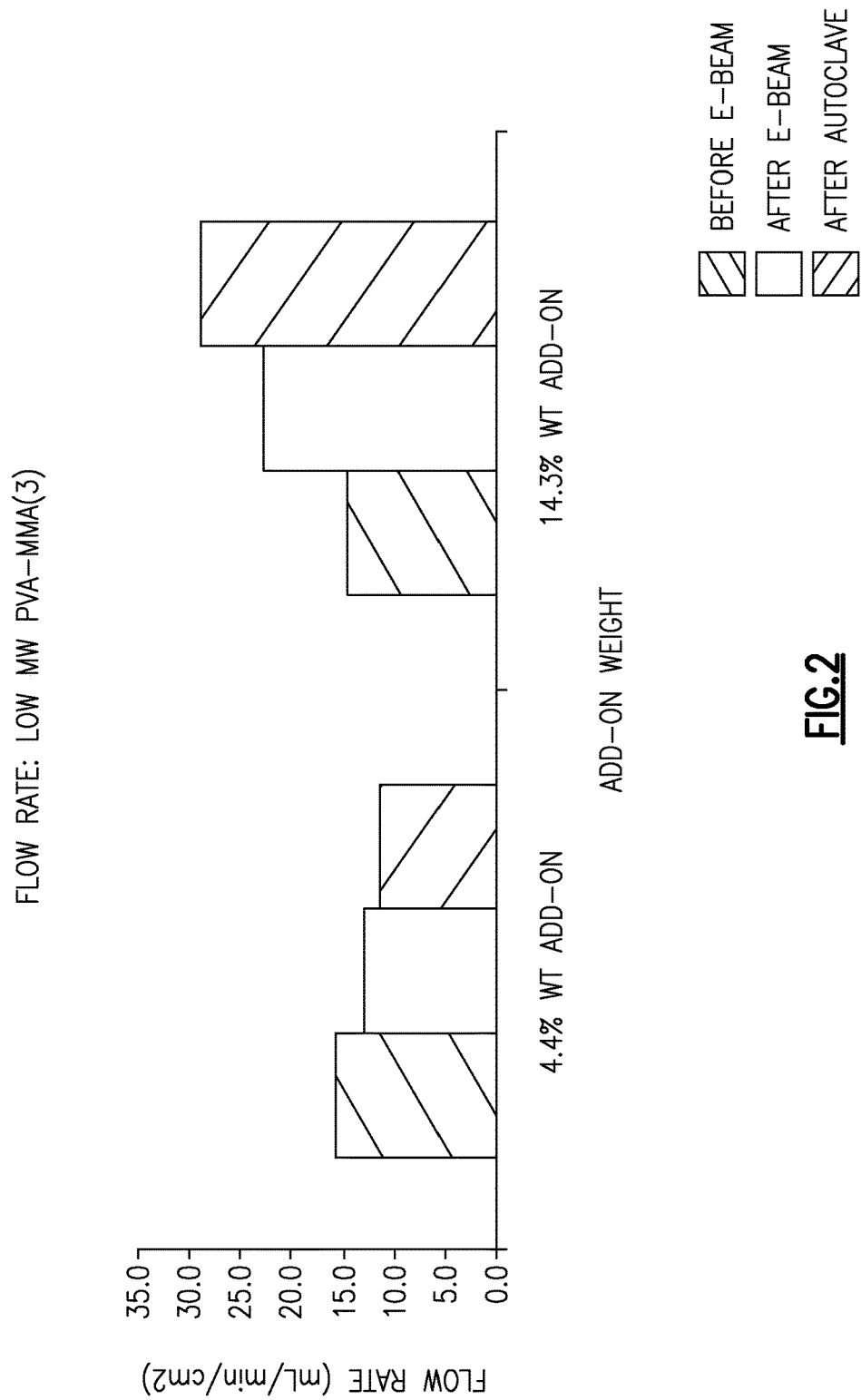
FIG. 2 graphically illustrates water flow rate as a function of add-on weight of low molecular weight 2-isocyanatoethyl methacrylate functionalized PVA on ePTFE before e-beam, after e-beam and after autoclaving.

In FIG. 2 and Table 1, flow rate data are given for two ePTFE samples coated with low molecular weight PVA-MMA (3). The samples were prepared with 4.4 wt % and 14.3 wt % add-on of PVA-MMA (3). The (#) corresponds to mol % of the polymer repeat units bearing pendant methacrylate functionality, as determined by $^1$H NMR spectroscopy. Flow rates are reported for before e-beam treatment, after e-beam treatment (40 kGy), and after steam autoclave (121° C. and 21 psi for 30 minutes). High flow rates and complete membrane wet out were observed in all conditions, for each sample.

Example 16

Figure 3:
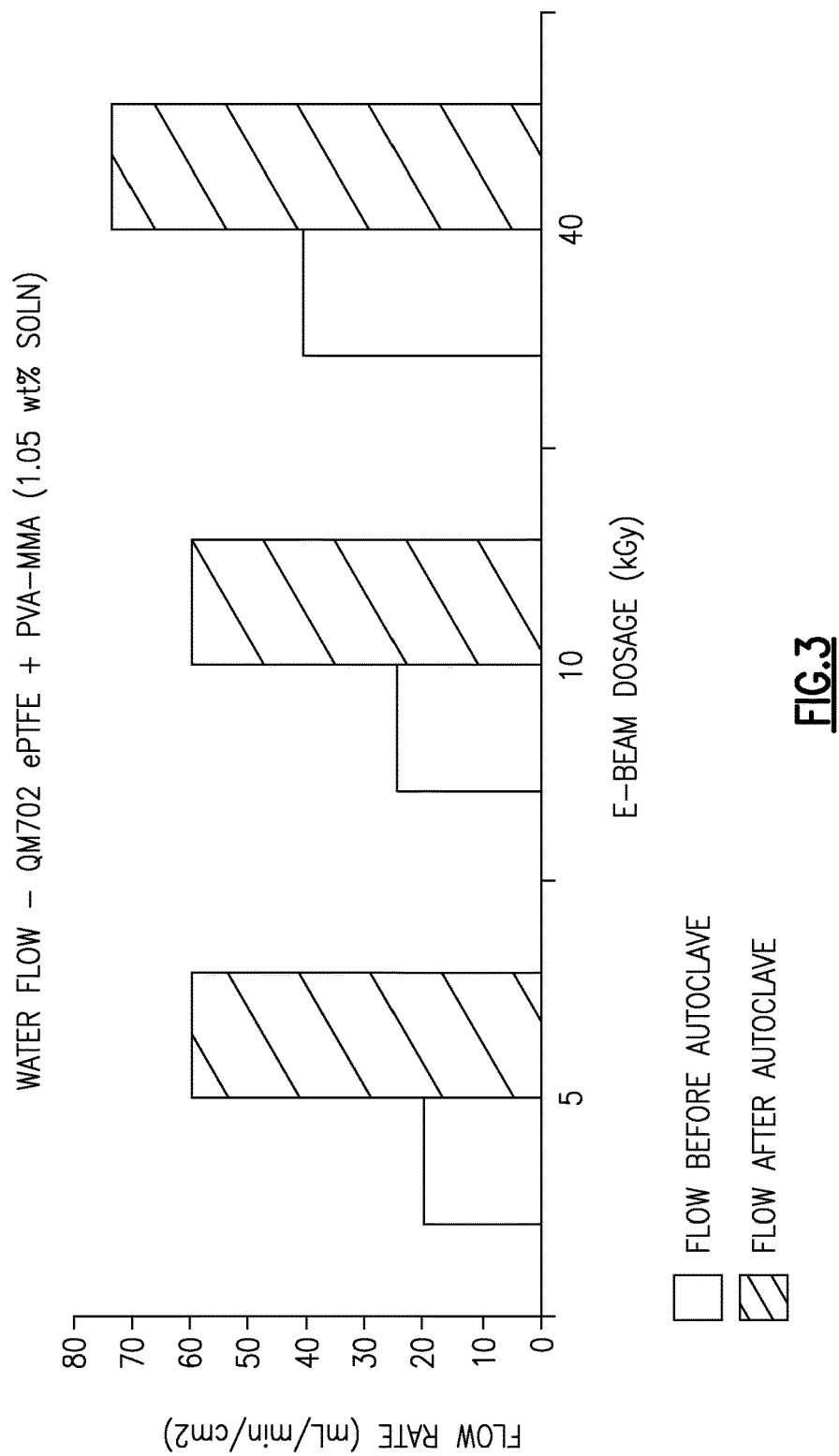
FIG. 3 graphically illustrates water flow rate as a function of e-beam exposure dosage for a 2-isocyanatoethyl methacrylate functionalized PVA on ePTFE before and after autoclaving.

In this example, the effect of e-beam dosage level was also investigated from 5-40 kGy, as illustrated in FIG. 3. Flow rates and weight percent add-on levels are documented in Table 1 for PVA-MMA (2.4). Even at dosage levels of only 5 kGy, autoclavability and high water flow rates were achieved. Complete membrane wet out and high water flow rates were observed following numerous autoclave cycles.

Example 17

Figure 4:
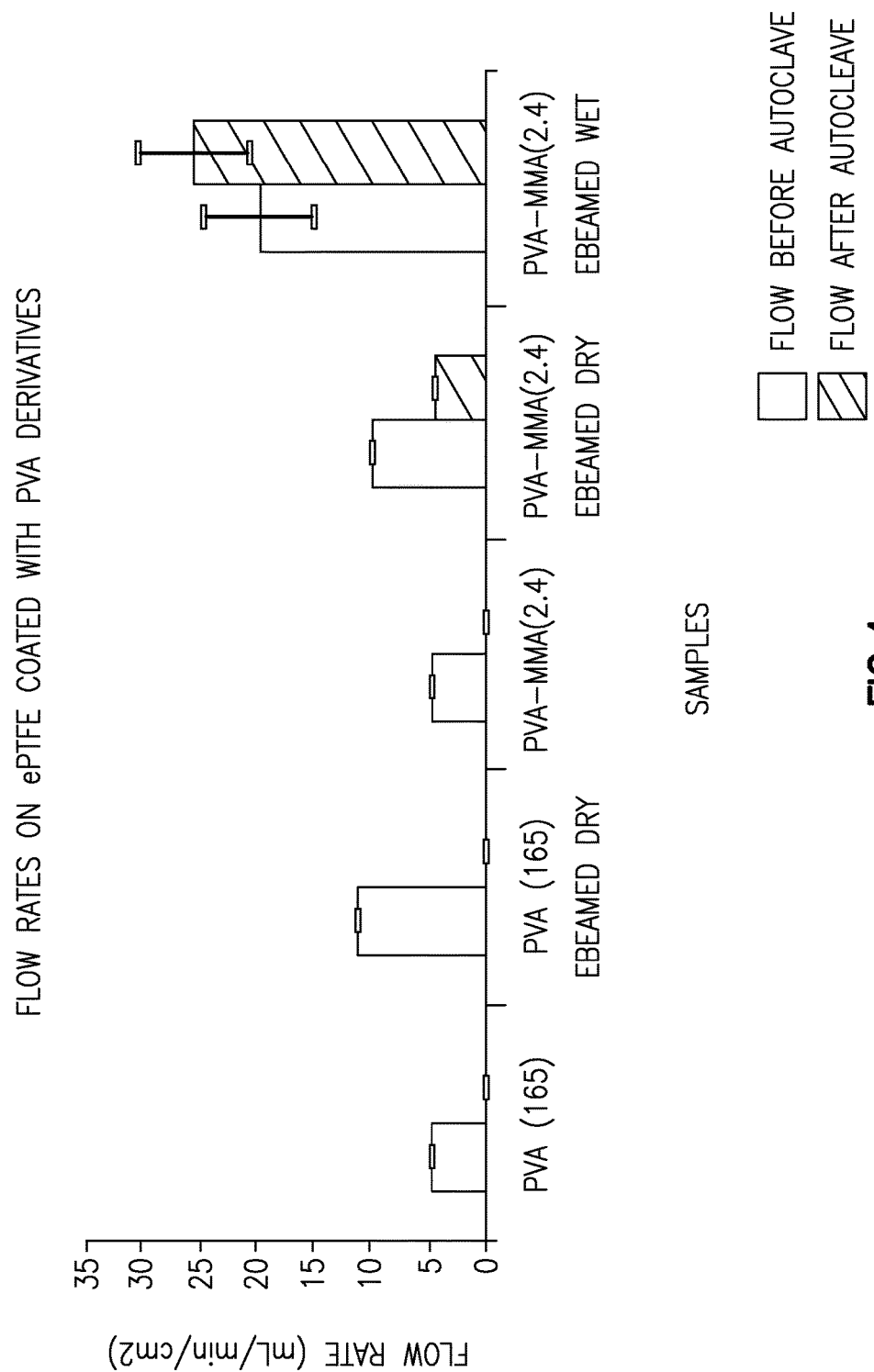
FIG. 4 graphically illustrates water flow rate for ePTFE coated with various functionalized polyvinyl alcohols before and after autoclaving.
Figure 5:
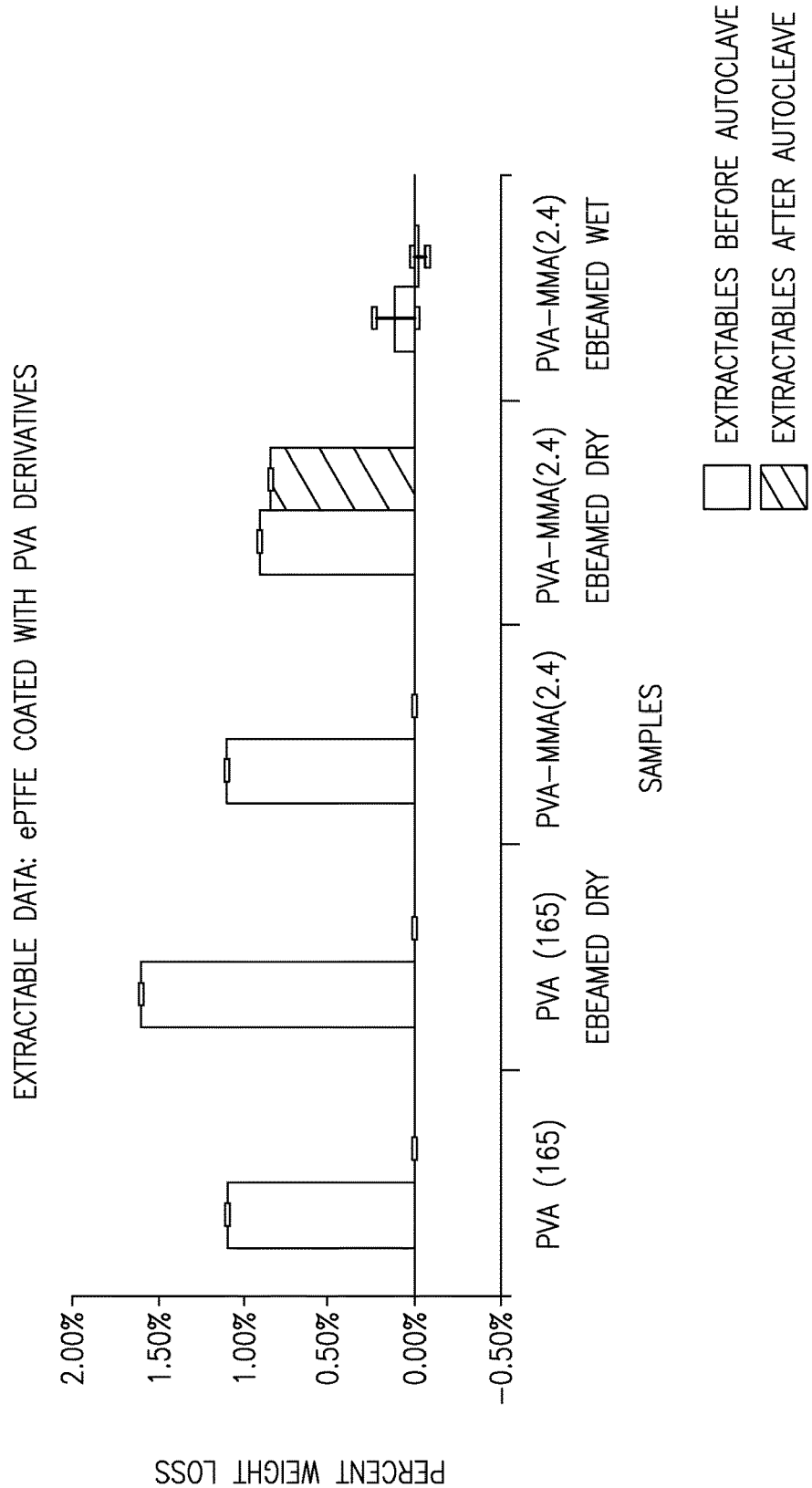
FIG. 5 graphically illustrates extractables weight loss for ePTFE coated with various functionalized polyvinyl alcohols before and after autoclaving.

In this example, two different chemistries were evaluated: PVA (Celvol 165 from Celanese) and PVA-MMA (2.4) (high molecular PVA derivatized with methacrylate functionality. Three different processing variables were analyzed, including no e-beam, e-beaming under dry membrane conditions, and e-beaming under water wet-out conditions. Flow rates before and after autoclave as well as percent losses are shown in FIGS. 4 and 5, respectively. A number of conclusions can be drawn, including: the flow rates for PVA-coated ePTFE increase following an e-beam dose of 40 kGy. This is observed in both PVA and PVA-MMA(2.4); PVA does not demonstrate autoclavability or any appreciable flow following autoclave; e-beaming wet leads to highly improved flow rates over e-beaming dry for PVA-MMA(2.4) coated on ePTFE. This was true for both before and after autoclave; e-beaming wet leads to dramatically lower extractables than e-beaming dry for PVA-MMA(2.4). Much lower extractable weight percent loss is observed for both before and after autoclave.

Example 18

In this example, functionalized PVA was synthesized and is referred to as PVA-UMA(2.6)-high MW. PVA (20.0 g, 456 mmol, Celvol 165 from Celanese Ltd.) was added to a 500 mL three-necked round-bottom flask with anhydrous DMSO (220 g) and stirred vigorously at 75° C. until a homogeneous solution was achieved. 2,6-Di-tert-butyl-4-methylphenol (BHT, 10 mg) was added as a radical initiator. The reaction was cooled to 40° C., and 2-isocyanatoethyl methacrylate (1.83 g, 11.8 mmol) was added slowly, i.e., dropwise over the course of five minutes, to the vigorously stirring (400 rpm) solution. The viscous solution was stirred for 15 minutes, and then cooled to room temperature. $^1$H NMR spectroscopy in DMSO-$d_6$ showed full conversion. The polymer was precipitated into isopropanol (1200 mL total). The flocculent white solid was dried under vacuum at room temperature. $^1$H NMR showed approximately 2.6% of the repeat units contained the graftable methacrylate linkage (21.7 g, 100% yield, 100% conversion). $^1$H NMR (DMSO-$d_6$, 400 MHz) δ 7.21 (1H, bm, NH) 6.07 (1H, bs, CHH═CMe), 5.67 (1H, bs, CHH═CMe), 4.94 (1H, bm, OH of PVA) 4.68 (8H, bm, OH of PVA), 4.49 (19H, bm, OH of PVA), 4.24 (13H, bm, OH of PVA), 4.07 (2H, bm, CH$_2$CH$_2$), 3.9-3.6 (38H, CH of PVA, 3.25 (2H, bm, CH$_2$CH$_2$), 1.88 (3H, bs, CHH═CMe), 1.8-1.2 (80H, bm, CH$_2$ of PVA).

Example 19

In this example, functionalized PVA was synthesized and is referred to as PVA-UMA(2.6)-high MW, 6 kg scale-up. DMSO (30 kg) was added to a Pfaudler glass-lined, 50-gallon, steel reactor equipped with a retreating curve agitator, baffle, and thermal well, in the Process Development Facility (PDF). PVA (6.0 kg, 136 mol, Celvol 165 from Celanese Ltd.) was added slowly with agitation at around 50 rpm. Additional DMSO (36 kg) was added to the stirring mixture. The mixture was slowly heated to 60° C. and stirred under air until a homogeneous solution was achieved. 2,6-Di-tert-butyl-4-methylphenol (BHT, 6 g) was added as a radical inhibitor. 2-Isocyanatoethyl methacrylate (550 g, 11.8 mol) was added dropwise over the course of 195 minutes to the vigorously stirring solution (126 rpm). The viscous solution was stirred for an additional 15 minutes, and a small aliquot was sampled for analysis. $^1$H NMR spectroscopy in DMSO-$d_6$ showed 100% conversion. The reactor and its contents were cooled to RT overnight. The polymer (5 L of solution at a time) was precipitated into a vigorously stirring solution of isopropanol (25 L) using a Henschel Homogenizer. The flocculent white solid was centrifuged, reslurried with isopropanol, and chopped with the Henschel. The polymer was then soaked in excess isopropanol (~6 kg in 200 L isopropanol) in large polypropylene drums for 4 days to remove residual DMSO in the polymer. The process was repeated again, and the polymer was re-soaked for another 5 days. The polymer was centrifuged at high speeds to dry, and the polymer was rechopped in the Henschel Homogenizer. $^1$H NMR showed 2.6% of the repeat units contained the graftable methacrylate linkage (6.5 kg, 99% yield, 100% conversion). $^1$H NMR (DMSO-$d_6$, 400 MHz) δ 7.21 (1H, bm, NH), 6.07 (1H, bs, CHH═CMe), 5.67 (1H, bs, CHH═CMe), 4.94 (1H, bm, OH of PVA), 4.68 (8H, bm, OH of PVA), 4.49 (19H, bm, OH of PVA), 4.24 (13H, bm, OH of PVA), 4.07 (2H, bm, CH$_2$CH$_2$), 3.9-3.6 (38H, CH of PVA, 3.25 (2H, bm, CH$_2$CH$_2$), 1.88 (3H, bs, CHH═CMe), 1.8-1.2 (80H, bm, CH$_2$ of PVA).

Example 20

In this example, ePTFE (QM702 series membrane from GE Energy) was coated with PVA-UMA(2.6), which had been prepared in accordance with Example 18. PVA-UMA (2.6) (2.50 g) was dissolved in deionized water (98 g) at 50° C. Using a blender for high shear rates, isopropanol (100 mL) was slowly added to the mixing solution. Evaporation of the volatiles showed a 1.20 wt % PVA-UMA(2.6) solution (theoretical wt %=1.25%). BHA ePTFE membrane, based on BHA ePTFE Part #QM702, was wetted out fully in the PVA-UMA(2.6) solution and excess solution was squeegeed off. The transparent coated ePTFE samples were constrained in polypropylene hoops and allowed to air dry. Weight percent add-ons were determined to be between 6-10 wt %.

Example 21

In this example, ePTFE (QM702 series membrane from GE Energy) was coated with PVA-UMA(2.6) which had been prepared in accordance with Example 18 in combination with the desired hydrophilic additive at the desired weight percent. Particular additives and their respective weight percents evaluated are reported in Table 2, hereinbelow.

To the 1.20 wt % PVA-UMA(2.6) solution above was added the desired hydrophilic additive in the desired weight percent with respect to PVA-UMA gravimetric amount. Samples were prepared with approximately 7-10 total wt % add-on consisting of a prepared solution containing PVA-UMA and 10 or 30 wt % hydrophilic additive with respect to PVA-UMA. For instance, for 10 wt % hydrophilic additive, a 100 g solution with 1 g PVA-UMA (1.0 wt % solution would have 0.1 g hydrophilic additive added to the solution. And, e.g., a 30 wt % hydrophilic additive sample was prepared by adding 36 mg PEG-DA (average Mn 700) to the 1.2% PVA-UMA solution made with 120 mg PVA-UMA. BHA ePTFE membrane, based on BHA ePTFE Part #QM702, was wetted out fully in the PVA-UMA(2) solution and excess solution was squeegeed off. The transparent coated ePTFE samples were constrained in polypropylene hoops and allowed to air dry. Weight percent add-ons were determined to be between 6-8 wt %.

Example 22

In this example, coated PVA-derived ePTFE samples were e-beamed in a constrained environment (i.e., polypropylene hoops). The samples were sprayed with deionized water until complete wet-out of the membranes was achieved (i.e., completely transparent). Excess water was removed by squeegee, wipe, or other technique to ensure no pooling of water occurred on the membrane. The samples were placed in the AEB e-beam apparatus and placed under a nitrogen blanket until the oxygen concentration was less than 200 ppm. At a standard voltage of 125 kV, the wet sample was exposed to the desired dosage, i.e., either 5 or 10 kGy.

Figure 6:
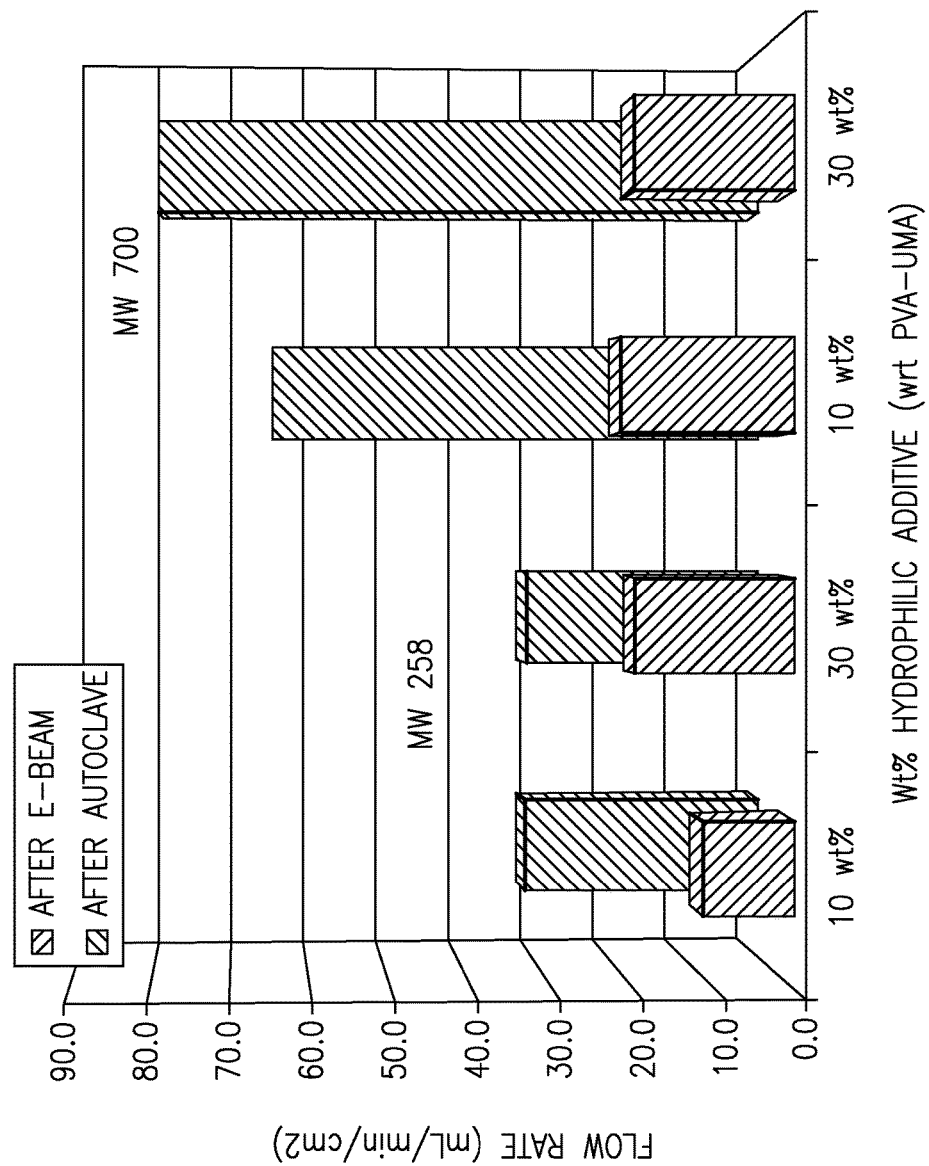
FIG. 6 graphically illustrates water flow rate as a function of weight percent hydrophilic additive for ePTFE coated with PVA-UMA and differing molecular weights of the hydrophilic additive polyethylene glycol diacrylate (PEG-DA) after e-beam irradiation at 10 kGy, before and after autoclaving.
Figure 7:
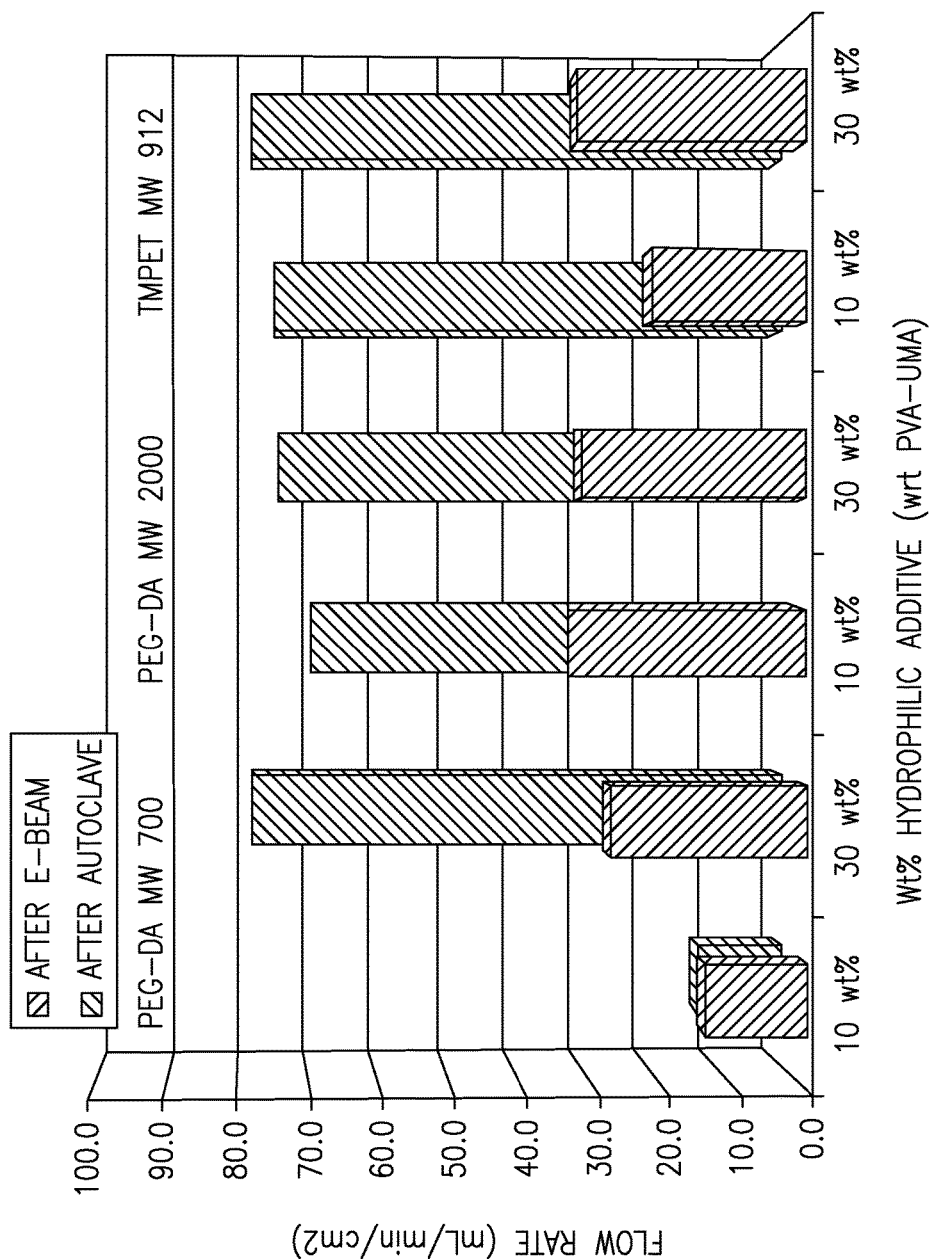
FIG. 7 graphically illustrates water flow rate as a function of weight percent hydrophilic additive for ePTFE coated with PVA-UMA and various molecular weights of various hydrophilic additives after e-beam irradiation at 5 kGy, before and after autoclaving.

Flow rates of the sample membranes prepared in accordance with Examples 18-22 after e-beam and after autoclaving are provided in Table 2 below. Membranes coated with PVA-UMA(2.6) alone are used as the control. ePTFE (GE Energy Part #QM702; Roll 73965-1LB) was coated with a pre-dissolved solution of hydrophilic additive mixed with a 1.2 wt % PVA-UMA(2.6) solution in 1:1 water:IPA Flow rates were measured both before and after a 30-minute, 121° C., 1.5 atm autoclave cycle. FIGS. 6 and 7 show graphically the flow rates of the coated membranes exposed to e-beam irradiation at 10 and 5 kGy, respectively.

TABLE 2

Flow rates after e-beam and after autoclave for functionalized
ePTFE samples coated with PVA-UMA(2.6) and a hydrophilic additive.

| Additive | Additive MW (g/mol) | Additive Wt % | Wt % Add-on[b] | Dosage (kGy) | Before E-beam Wettability[c] | After E-Beam Flow rate[d] | After Autoclave Wettability[c] | After Autoclave Flow rate[d] |
|---|---|---|---|---|---|---|---|---|
| None[e] | N/A[f] | N/A[f] | 8.6% | 5 | 4.0 | 12.2 | 3.75 | 46.6 |
| PEG-DA | 258 | 10 | 7.4% | 10 | 4.0 | 11.5 | 3.5 | 31.1 |
| PEG-DA | 258 | 30 | 8.9% | 10 | 3.0 | 19.8 | 3.0 | 31.1 |
| PEG-DA | 700 | 10 | 8.9% | 10 | 4.75 | 21.6 | 4.75 | 64.6 |
| PEG-DA | 700 | 30 | 10.4% | 10 | 5.0 | 20.2 | 4.75 | 79.3 |
| PEG-DA[g] | 700 | 10 | 8.6% | 5 | 4.25 | 14.1 | 1.75 | 12.2 |
| PEG-DA[e] | 700 | 30 | 9.4% | 5 | 5.0 | 27.7 | 5.0 | 77.5 |
| PEG-DA[g] | 2000 | 10 | 7.4% | 5 | 4.75 | 33.0 | 4.75 | 69.3 |
| PEG-DA[g] | 2000 | 30 | 9.1% | 5 | 5.0 | 31.7 | 4.5 | 74.2 |
| TMPET[g] | 912 | 10 | 7.7% | 5 | 4.25 | 21.9 | 4.25 | 74.3 |
| TMPET[g] | 912 | 30 | 8.9% | 5 | 4.75 | 32.4 | 4.5 | 77.5 | ePTFE (GE Energy Part # QM702; Roll 73965-1LB) was coated with a pre-dissolved solution of hydrophilic additive mixed with a 1.2 wt % PVA-UMA(2.6) solution in 1:1 water: IPA. The additive weight percents of hydrophilic additive are relative to the amount of PVA-UMA in solution. For example, 30-wt % hydrophilic additive corresponds to 30 mg hydrophilic additive being added to a 1% PVA-UMA solution made with 100 mg PVA-UMA. All samples were wet out with water and then exposed to e-beam irradiation.
[b]Weight percent add-ons are calculated by: (membrane weight after coating - membrane weight before coating)/membrane weight before coating.
[c]Based on a scale of 1 to 5 with 1 meaning completely opaque (no water wettability) and 5 meaning full transparency (complete water wet-out) using visual inspection of water wet-out on membranes.
[d]DI water flow rates are measured in mL/min-cm$^2$ @ 27" Hg vacuum.
[e]Average of three samples.
[f]Not applicable.
[g]Average of two samples.

As shown in Table 2 and FIGS. 6 and 7, PVA-UMA-coated ePTFE containing either the diacrylated (PEG-DA) and triacrylated (TMPET) additives were autoclavable and gave high water flow rates following autoclave. The samples employing higher molecular weight PEG-DA samples ($M_n$ 700 and 2000) outperformed the samples with lower molecular weight PEG-DA ($M_n$ 258). At 5 kGy, PEG-DA $M_n$ 700 at 10 wt % was below the threshold necessary to give uniformly autoclavable membranes. However, at 10 kGy, 10 wt % additive was adequate to give uniformly autoclavable membranes and significant flow rates. At both 5 and 10 kGy, PEG-DA $M_n$ 700 at 30 wt % was more than adequate to enable excellent membrane wettability and extremely fast water flows following autoclave. At 5 kGy, the samples employing TMPET as additive gave good water wettability and improved autoclavability at both 10 and 30 wt %.

Figure 8:
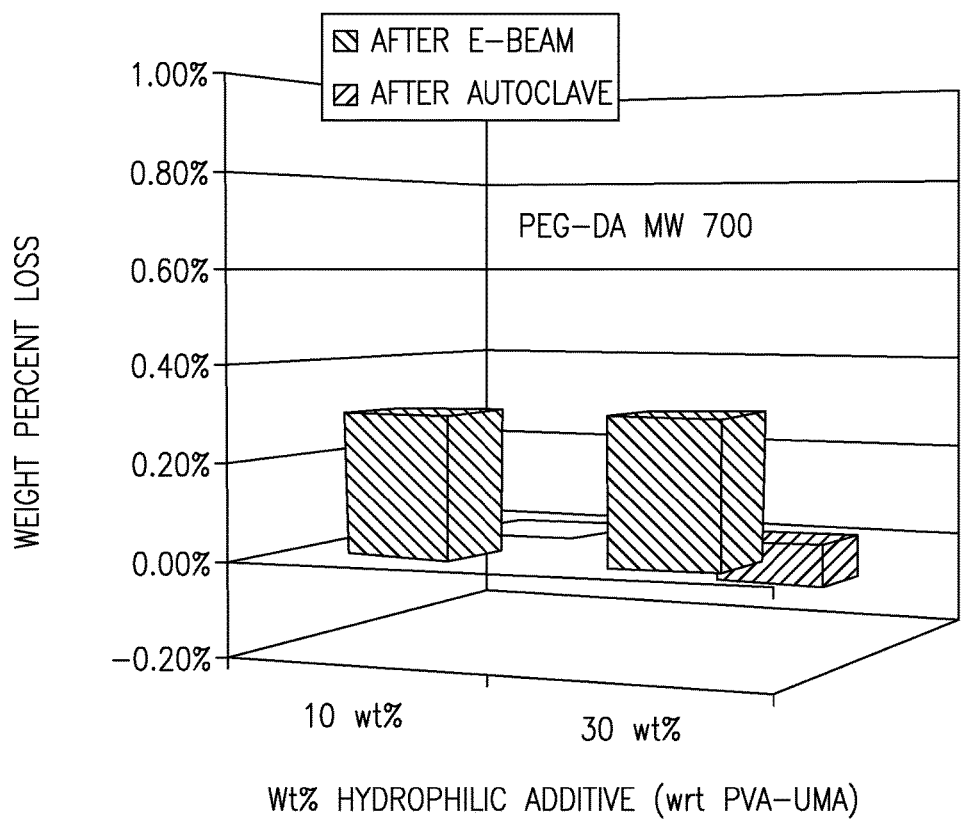
FIG. 8 graphically illustrates extractables weight loss for ePTFE coated with PVA-UMA and the hydrophilic additive PEG-DA after e-beam irradiation at 10 kGy, before and after autoclaving.
Figure 9:
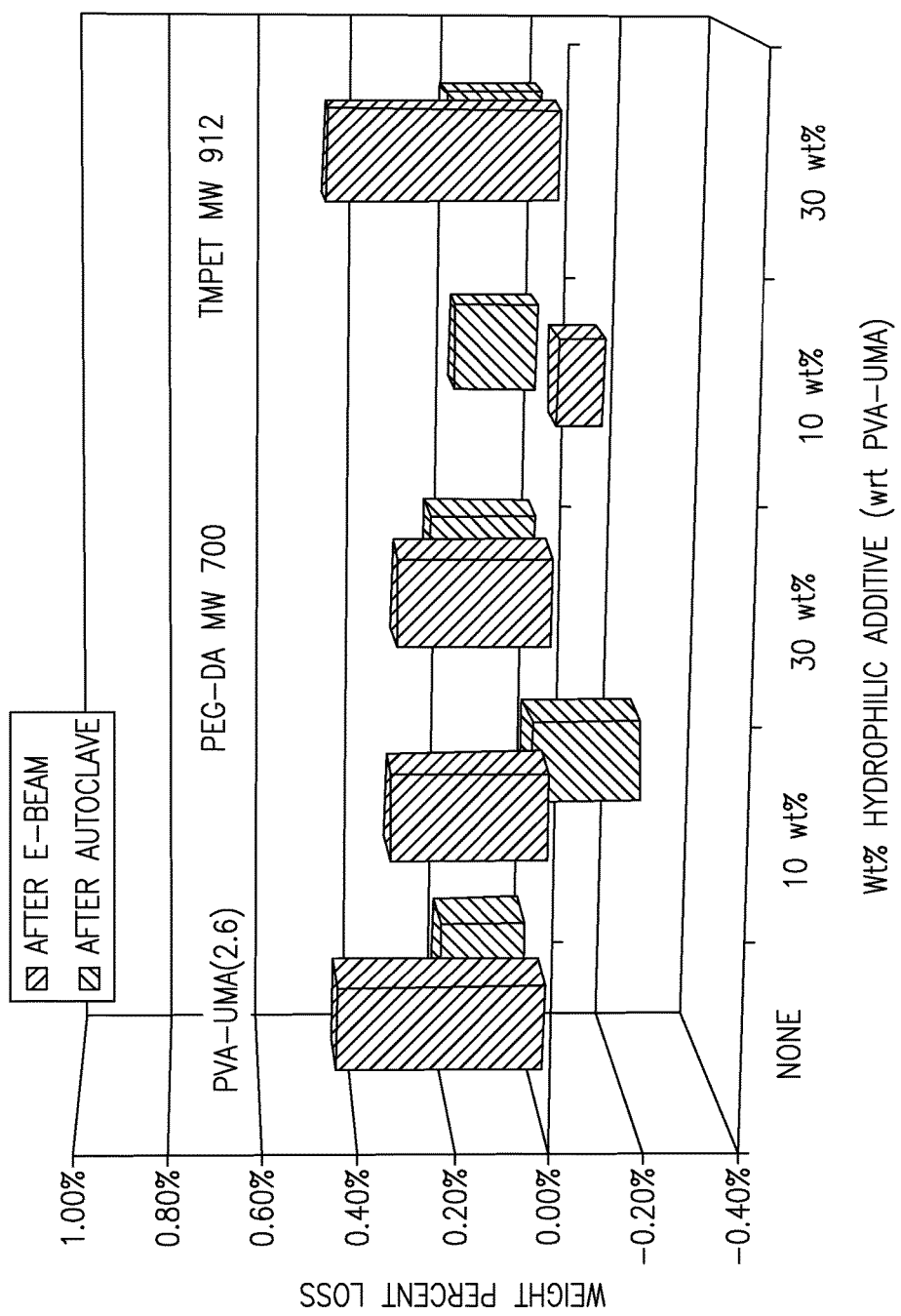
FIG. 9 graphically illustrates extractables weight loss for ePTFE coated with PVA-UMA and various molecular weights of various hydrophilic additives after e-beam irradiation at 5 kGy, before and after autoclaving.

In Table 3 and FIGS. 8 and 9, the extractables data are reported for the same set of materials that are described above and whose flow rates are illustrated in FIGS. 3 and 4. Extractables is defined as the percentage of unbound material that is removed from the membrane following extraction in deionized water at 80° C. for 24 hours. Percent extractables were determined by the weight percentage difference between the dried samples before and after extraction. The goal is to get extractables levels as close to zero as possible. ePTFE that has been coated with a solution of PVA-UMA (2.6) and PEG-DA MW 700 (10 or 30 wt % PEG-DA with respect to PVA-UMA) was exposed to e-beam irradiation at 10 kGy. Extractables were measured both after e-beam exposure and after one autoclave cycle (FIG. 8). After e-beam, extractables of about 0.3 wt % were observed, whereas after autoclave, no extractables were detected.

TABLE 3

Extractables data after e-beam and after autoclave for functionalized ePTFE
samples coated with PVA-UMA(2.6) and a hydrophilic additive.

| Additive | Wt % Additive | Dose (kGy) | After E-beam | Std. Dev | After Autoclave | Std. Dev |
|---|---|---|---|---|---|---|
| No additive | none | 5 | 0.45% | 0.15% | 0.20% | 0.01% |
| PEG-DA MW 700 | 10 wt % | 5 | 0.34% | 0.13% | −0.25% | 0.23% |
| PEG-DA MW 700 | 30 wt % | 5 | 0.33% | 0.08% | 0.23% | 0.07% |
| TMPET MW 912 | 10 wt % | 5 | −0.10% | 0.06% | 0.18% | 0.03% |
| TMPET MW 912 | 30 wt % | 5 | 0.48% | 0.06% | 0.21% | 0.04% |
| PEG-DA MW 700 | 10 wt % | 10 | 0.30% | | −0.01% | |
| PEG-DA MW 700 | 30 wt % | 10 | 0.31% | 0.19% | −0.09% | |

The lowest e-beam dosage capable of achieving a hydrophilic membrane that survives autoclave cycles is desirable because electron beam gradually damages the mechanical integrity of ePTFE as dose is increased. Therefore, extractables data were collected for hydrophilic samples exposed to e-beam irradiation at 5 kGy. ePTFE coated with PVA-UMA (2.6) but no hydrophilic additive was included as a control. Both PEG-DA MW 700 and TMPET MW 912 were investigated at 10 and 30 wt % with respect to PVA-UMA. With the exception of TMPET at 10 wt %, all samples showed percent extractables of between 0.3 to 0.4 wt % after e-beam. A comparison of PEG-DA MW 700 samples at 5 kGy versus analogous samples exposed at 10 kGy showed virtually no difference in extractables after e-beam. Following autoclave, the percent extractables typically decreased to below 0.2 wt %. Interestingly, there was no significant difference observed between the control sample containing no hydrophilic additive versus the samples containing PEG-DA or TMPET. It was therefore concluded that the hydrophilic additives were not contributing to higher extractable levels.

As used herein, the term "comprising" means various compositions, compounds, components, layers, steps and the like can be conjointly employed in the present invention. Accordingly, the term "comprising" encompasses the more restrictive terms "consisting essentially of" and "consisting of."

Unless defined otherwise, technical and scientific terms used herein have the same meaning as is commonly understood by one of skill in the art to which this invention belongs. The terms "a" and "an" do not denote a limitation of quantity, but rather denote the presence of the referenced item.

Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

This written description uses examples to disclose the invention, including the best mode, and also to enable practice of the invention, including making and using any devices or systems and performing any incorporated methods. The patentable scope of the invention is defined by the claims, and may include other examples. Such other examples are intended to be within the scope of the claims if they have structural elements that do not differ from the literal language of the claims, or if they include equivalent structural elements with insubstantial differences from the literal languages of the claims.

The invention claimed is:

1. A membrane, comprising:
 a porous base membrane; and
 an autoclavable hydrophilic coating bonded to the porous base membrane, wherein the hydrophilic coating comprises:
 a hydrophilic additive comprising at least one of an acrylate, diacrylate, triacrylate or other multiacrylate, acrylamide, vinyl ketone, styrenic, vinyl ether, vinyl- or allyl-containing moiety, and/or benzyl and tertiary-carbon ($CHR_3$); and
 a derivative of a hydrophilic polymer having an average molecular weight of greater than 2500 Daltons, wherein the derivative is formed prior to application to the base membrane by a derivatization reaction of reactive groups present at the ends of the hydrophilic polymer and reactive groups present along the polymer chain of the hydrophilic polymer with a material independent of the hydrophilic additive and containing electron beam reactive groups, wherein the electron beam reactive groups are present along the polymer chain of the hydrophilic polymer after the derivatization reaction and comprise at least one of methacrylates, acrylates, acrylamides, vinyl ketones, styrenics, vinyl ethers, vinyl- or allyl-containing moieties, and/or benzyl and/or tertiary-carbon ($CHR_3$) based materials;
 wherein the electron beam reactive groups of the derivative of a hydrophilic polymer react with the porous base membrane and form covalent bonds upon exposure to high energy irradiation; and
 wherein the membrane exhibits water wettability and flow rates after autoclaving.

2. The membrane of claim 1, wherein the porous base membrane comprises one or more of polyolefins selected from the group consisting of polyethylene, polypropylene, polymethylpentene, polystyrene, substituted polystyrenes, poly(vinyl chloride, and polyacrylonitriles, polyamide, polyester, polysulfone, polyether, acrylic and methacrylic polymers, polystyrene, polyurethane, polycarbonates, polyesters selected from the group consisting of polyethylene terephthalic ester, and polybutylene terephthalic ester, polyether sulfones, polypropylene, polyethylene, polyphenylene sulfone, cellulosic polymer, polyphenylene oxide, polyamides selected from the group consisting of nylon, and polyphenylene terephthalamide and combinations of two or more thereof.

3. The membrane of claim 2, wherein the electron beam reactive group comprises at least one of methacrylates, acrylates, acrylamides, vinyl ketones, styrenics, vinyl ethers, vinyl- or allyl-containing moieties, and/or benzyl and tertiary-carbon ($CHR_3$) based materials.

4. The membrane of claim 3, wherein the hydrophilic coating contains a mole percent between 0.1 mol % to 10 mol % of the electron beam reactive group units with regards to total polymer repeat units.

5. The membrane of claim 1, wherein the electron beam reactive group is covalently grafted to the porous base membrane.

6. The membrane of claim 1, wherein the molecular weight of the hydrophilic additive(s) is about 250 g/mol to about 100,000 g/mol.

7. The membrane of claim 6, wherein the hydrophilic additive comprises a diacrylate.

8. The membrane of claim 7, wherein the diacrylate comprises at least one of polyethylene glycol diacrylate, tetra(ethylene glycol) diacrylate, trimethylolpropane ethoxylate, methyl ether diacrylate, 1,3-butanediol diacrylate, glycerol 1,3-diglycerolate diacrylate, 1,6-hexanediol ethoxylate diacrylate, bisphenol A ethoxylate diacrylate, tri(propylene glycol) glycerolate diacrylate, poly(propylene glycol) diacrylate, or combinations of these.

9. The membrane of claim 6, wherein the hydrophilic additive comprises a triacrylate.

10. The membrane of claim 9, wherein the triacrylate-comprises at least one of trimethylolpropane ethoxylate triacrylate, trimethylolpropane propoxylate triacrylate, or a combination thereof.

11. The membrane of claim 6, wherein the hydrophilic additive comprises a dimethylacrylate.

12. The membrane of claim 11, wherein the dimethylacrylate comprises at least one of poly(ethylene glycol) dimethacrylate, poly(propylene glycol) dimethacrylate, 1,3-butanediol dimethacrylate or combinations of these.

13. The membrane of claim 6, wherein the hydrophilic additive comprises at least one of polyethylene glycol diacrylate, trimethylolpropane ethoxylate triacrylate, or combinations thereof.

14. The membrane of claim 1, wherein the hydrophilic additive is present in amounts of from about 0.1 wt % to 1000 wt % based upon the weight of the hydrophilic polymer in the hydrophilic coating.

15. The membrane of claim 1 wherein the hydrophilic coating is present in amounts of from about 0.1 wt % add-on to about 100 wt % add-on, based upon the weight of the base membrane.

16. A porous membrane, comprising:
a porous base membrane formed of a fluoropolymer; and
an autoclavable hydrophilic coating covalently grafted to the fluoropolymer comprising a hydrophilic additive and a derivative of a hydrophilic polymer,
wherein the porous membrane has a flow rate of water greater than about 1 mL/min-cm$^2$ at 27 inches Hg pressure differential after 10 wet/dry cycles at room temperature,
wherein the derivative of the hydrophilic polymer is formed prior to coating onto the base membrane and comprises at least one of a polyvinyl alcohol, a polyvinyl alcohol-polyvinyl amine copolymer, a polyacrylic acid, a polyacrylate, a polyethylene amine, a polyvinyl amine, and/or derivatives thereof wherein the reactive groups present at the ends of the hydrophilic polymer and reactive groups along the polymer chain of the hydrophilic polymer have been reacted with a material independent of the hydrophilic additive and containing electron beam reactive groups so that the hydrophilic polymer is derivatized with electron beam reactive groups adapted to form radicals under high energy irradiation and configured to react with the base membrane to form covalent bonds,
wherein the electron beam reactive groups are present along the polymer chain of the hydrophilic polymer after the reaction with a material independent of the hydrophilic additive and comprise at least one of methacrylates, acrylates, acrylamides, vinyl ketones, styrenics, vinyl ethers, vinyl- or allyl-containing moieties, and/or benzyl and/or tertiary-carbon (CHR$_3$) based materials; and
wherein the hydrophilic additive comprises at least one of acrylate, diacrylate, triacrylate, multiacrylate, acrylamide, vinyl ketone, styrenic, vinyl ether, vinyl- or allyl-containing moiety, benzyl-carbon, tertiary-carbon (CHR$_3$), or combinations thereof.

17. The porous membrane of claim 16, wherein the porous membrane has an average pore size of 10 nm to 50 microns as measured by bubble point measurements.

18. The porous membrane of claim 16, wherein the hydrophilic polymer comprises at least one of a polyvinyl alcohol and derivatives thereof.

19. The porous membrane of claim 16, wherein the fluoropolymer comprises at least one of ePTFE, polyvinylidene difluoride (PVDF), poly(tetrafluoroethylene-co-hexafluoropropylene) (FEP), poly(ethylene-alt-tetrafluoroethylene) (ETFE), polychlorotrifluoroethylene (PCTFE), poly(tetrafluoroethylene-co-perfluoropropyl vinyl ether) (PFA), poly(vinylidene fluoride-co-hexafluoropropylene (PVDF-co-HFP), polyvinyl fluoride (PVF), or combinations of these.

20. The porous membrane of claim 19, wherein the fluoropolymer comprises ePTFE.

21. The porous membrane of claim 16, wherein the membrane has a weight percent add-on and/or burn-off weight percent of the hydrophilic coating from 0.5 to 100 weight percent.

22. The membrane of claim 16, wherein the diacrylate is at least one of polyethylene glycol diacrylate, tetra(ethylene glycol) diacrylate, trimethylolpropane ethoxylate, methyl ether diacrylate, 1,3-butanediol diacrylate, glycerol 1,3-diglycerolate diacrylate, 1,6-hexanediol ethoxylate diacrylate, bisphenol A ethoxylate diacrylate, tri(propylene glycol) glycerolate diacrylate, poly(propylene glycol) diacrylate, and wherein the triacrylate is at least one of trimethylolpropane ethoxylate triacrylate, trimethylolpropane propoxylate triacrylate, poly(ethylene glycol) dimethacrylate, poly(propylene glycol) dimethacrylate, 1,3-butanediol dimethacrylate, or any combination thereof.

23. The membrane of claim 22, wherein the hydrophilic additive comprises at least one of polyethylene glycol diacrylate, trimethylolpropane ethoxylate triacrylate, or combinations thereof.

24. A process for forming an autoclavable hydrophilic surface on a porous membrane, the process comprising:
applying hydrophilic coating comprising a hydrophilic additive and a derivative of a hydrophilic polymer having an average molecular weight of greater than 2500 Daltons and derivatized with electron beam reactive groups configured to react with a porous base membrane and form covalent bonds, wherein the electron beam reactive groups are present along the polymer chain of the hydrophilic polymer and comprise at least one of methacrylates, acrylates, acrylamides, vinyl ketones, styrenics, vinyl ethers, vinyl- or allyl-containing moieties, and/or benzyl and/or tertiary-carbon (CHR$_3$) based materials;
irradiating the coated porous base membrane with a high energy source; and covalently grafting the electron beam reactive groups to the porous base membrane to form the hydrophilic surface on the porous base membrane, wherein the porous membrane exhibits water wettability and flow rates after autoclaving and wherein the derivative of the hydrophilic polymer comprises a reaction product of at least one of a polyvinyl alcohol, a polyvinyl alcohol-polyvinyl amine copolymer, a polyacrylic acid, a polyacrylate, a polyethylene amine, a polyvinyl amine, and/or derivatives thereof with a material independent of the hydrophilic additive and containing electron beam reactive groups so that the hydrophilic polymer is derivatized with electron beam reactive groups adapted to form a radical under high energy irradiation and configured to react with the base membrane and form covalent bonds, wherein the electron beam reactive groups comprises at least one of methacrylates, acrylates, acrylamides, vinyl ketones, styrenics, vinyl ethers, vinyl- or allyl-containing moieties, and/or benzyl and/or tertiary-carbon (CHR$_3$) based materials; and
wherein the hydrophilic additive comprises at least one of acrylate, diacrylate, triacrylate, multiacrylate, acrylamide, vinyl ketone, styrenic, vinyl ether, vinyl- or allyl-containing moiety, benzyl-carbon, tertiary-carbon (CHR$_3$), or combinations thereof.

25. The process of claim 24, further comprising applying water onto and wetting the coated porous base membrane prior to irradiating.

26. The process of claim 24, wherein the membrane has a weight percent add-on and/or burn-off weight percent of the hydrophilic coating from 3 to 15 weight percent.

27. The process of claim 24, wherein the hydrophilic polymer comprises a polyvinyl alcohol or derivative thereof.

28. The process of claim 24, wherein irradiating the coated porous base membrane with the high energy source comprises exposing the coated porous base membrane to an electron beam at a dosage rate within a range of from about 0.1 kGy to 2000 kGy.

29. The process of claim 28, wherein irradiating the coated porous base membrane with the high energy source comprises exposing the coated porous base membrane to an electron beam at a dosage rate within a range of from about 1 kGy to about 60 kGy.

30. The process of claim 29, wherein irradiating the coated porous base membrane with the high energy source comprises exposing the coated porous base membrane to an electron beam at a dosage rate within a range of from about 5 kGy to about 40 kGy.

31. The membrane of claim 16 wherein the material containing electron beam reactive groups is at least one of acryloyl chloride, (2H)-2-butenoyl chloride, maleic anhydride, methyl acrylate, 5,6-dihydro-2H-pyran-2-one, ethyl acrylate, methyl crotonate, allyl acrylate, vinyl crotonate, 2-isocyanatoethyl methacrylate, methacrylic acid, methacrylic anhydride, methacryloyl chloride, glycidyl methacrylate, 2-ethylacryloyl chloride, methyl 2-methyl acrylate, methyl trans-2-methoxyacrylate, citraconic anhydride, itaconic anhydride, methyl (2H)-2-methyl-2-butenoate, ethyl 2-methylacrylate, ethyl 2-cyanoacrylate, dimethylmaleic anhydride, allyl 2-methylacrylate, ethyl (2H)-2-methyl-2-butenoate, ethyl 2-ethylacrylate, methyl (2H)-2-methyl-2-pentenoate, 2-hydroxyethyl 2-methyl acrylate, methyl 2-(1-hydroxyethyl)acrylate, [3-(methacryloyloxy)propyl] trimethoxysilane, 3-(diethoxymethylsilyl)propyl methacrylate, 3-(trichlorosilyl)propyl 2-methyl acrylate, 3-(trimethoxysilyl)propyl 2-methylacrylate, 3-[tris(trimethylsiloxy)silyl]propyl methacrylate, 6-dihydro-1H-cyclopenta[c]furan-1,3(4H)-dione, methyl 2-cyano-3-methylcrotonate, trans-2,3-dimethylacrylic acid, and/or N-(hydroxymethyl)acrylamide; at least one of allyl bromide, allyl chloride, diketene, 5-methylenedihydro-2(3H)-furanone, 3-methylenedihydro-2(3H)-furanone, 3-methyl-2(5H)-furanone, 2-chloroethyl vinyl ether, and/or 4-methoxy-2(5H)-furanone;
at least one of vinyl isocyanate, allyl isocyanate, furfuryl isocyanate, 1-ethyl-4-isocyanatobenzene, 1-ethyl-3-isocyanatobenzene, 1-(isocyanatomethyl)-3-methylbenzene, 1-isocyanato-3,5-dimethylbenzene, 1-bromo-2-isocyanatoethane, (2-isocyanatoethyl)benzene, 1-(isocyanatomethyl)-4-methylbenzene, 1-(isocyanatomethyl)-3-methylbenzene, and/or 1-(isocyanatomethyl)-2-methylbenzene;
at least one of 3-vinylbenzaldehyde, 4-vinylbenzaldehyde, 4-vinylbenzyl chloride, trans-cinnamoyl chloride, phenylmaleic anhydride, and/or 4-hydroxy-3-phenyl-2(5H)-furanone; and/or at least one of glycidyl methacrylate, glycidyl vinyl ether, 2-(3-butenyl)oxirane, and/or 3-vinyl-7-oxabicyclo[4.1.0]heptane, and/or limonene oxide.

32. The membrane of claim 1 wherein the material containing electron beam reactive groups is any of 2-isocyanatoethyl methacrylate, methacrylic anhydride, glycidyl methacrylate and/or maleic anhydride.

33. The membrane of claim 16 wherein the material containing electron beam reactive groups is any of maleic anhydride, 2-isocyanatoethyl methacrylate, methacrylic anhydride, and/or glycidyl methacrylate.

34. The process of claim 24 wherein the material containing electron beam reactive groups is any of maleic anhydride, 2-isocyanatoethyl methacrylate, methacrylic anhydride, and/or glycidyl methacrylate.

* * * * *